US009880604B2

(12) United States Patent
Kansal et al.

(10) Patent No.: US 9,880,604 B2
(45) Date of Patent: Jan. 30, 2018

(54) ENERGY EFFICIENT LOCATION DETECTION

(75) Inventors: Aman Kansal, Issaquah, WA (US); Brian D. Cross, Seattle, WA (US); Gerardo Garcia, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/090,474

(22) Filed: Apr. 20, 2011

(65) Prior Publication Data

US 2012/0268249 A1    Oct. 25, 2012

(51) Int. Cl.
| | |
|---|---|
| G08B 25/00 | (2006.01) |
| G06F 1/32 | (2006.01) |
| G01C 21/20 | (2006.01) |
| G06F 1/16 | (2006.01) |
| H04W 4/00 | (2009.01) |
| H04W 4/02 | (2009.01) |

(52) U.S. Cl.
CPC ............ *G06F 1/3206* (2013.01); *G01C 21/20* (2013.01); *G06F 1/1694* (2013.01); *G06F 1/3215* (2013.01); *H04W 4/006* (2013.01); *H04W 4/02* (2013.01); *Y02B 60/50* (2013.01)

(58) Field of Classification Search
CPC .......................... G07C 9/00111; G08B 3/1083
USPC .......... 340/8.1, 10.5; 348/730, 8.1; 370/253, 370/252; 455/456.1, 456.3; 70/91; 701/119, 469; 600/301
See application file for complete search history.

(56) References Cited

U.S. PATENT DOCUMENTS

| | | | |
|---|---|---|---|
| 5,379,451 A * | 1/1995 | Nakagoshi ............ | H04W 60/00 455/435.1 |
| 5,883,598 A | 3/1999 | Parl et al. | |
| 6,067,565 A | 5/2000 | Horvitz | |
| 6,078,826 A | 6/2000 | Croft et al. | |
| 6,085,226 A | 7/2000 | Horvitz | |
| 6,182,133 B1 | 1/2001 | Horvitz | |
| 6,243,595 B1 | 6/2001 | Lee et al. | |
| 6,282,578 B1 | 8/2001 | Aizono et al. | |

(Continued)

FOREIGN PATENT DOCUMENTS

| | | |
|---|---|---|
| CN | 1984402 | 6/2007 |
| CN | 101112072 | 1/2008 |

(Continued)

OTHER PUBLICATIONS

"International Search Report & Written Opinion for PCT Patent Application No. PCT/US2013/060502", dated Mar. 5, 2014, dated Sep. 19, 2013, 10 Pages.

(Continued)

*Primary Examiner* — Nabil Syed

(57) ABSTRACT

In a device, one or more low energy sensors are used to determine a mobility state of the device. Based on both the mobility state of the device and one or more places of interest for the device, a determination is made as to when to use a high energy sensor to determine a location of the device. One of the one or more places of interest for the device within which the device is located at any particular time can be determined based on the mobility state of the device and/or the location of the device as determined by the high energy sensor.

20 Claims, 6 Drawing Sheets

(56) References Cited

U.S. PATENT DOCUMENTS

| | | |
|---|---|---|
| 6,286,001 B1 | 9/2001 | Walker et al. |
| 6,339,826 B2 | 1/2002 | Hayes et al. |
| 6,405,033 B1 | 6/2002 | Kennedy et al. |
| 6,446,069 B1 | 9/2002 | Yaung et al. |
| 6,504,480 B1 | 1/2003 | Magnuson et al. |
| 6,513,046 B1 | 1/2003 | Abbott, III et al. |
| 6,519,530 B2* | 2/2003 | Crockett et al. ............... 701/300 |
| 6,546,002 B1 | 4/2003 | Kim |
| 6,549,768 B1 | 4/2003 | Fraccaroli |
| 6,564,149 B2 | 5/2003 | Lai |
| 6,650,189 B1 | 11/2003 | Romao |
| 6,662,023 B1 | 12/2003 | Helle |
| 6,678,508 B1 | 1/2004 | Koilpillai et al. |
| 6,799,047 B1 | 9/2004 | Bahl et al. |
| 6,847,892 B2 | 1/2005 | Zhou |
| 6,920,455 B1 | 7/2005 | Weschler |
| 6,941,134 B2 | 9/2005 | White |
| 6,968,179 B1 | 11/2005 | De Vries |
| 6,990,353 B2 | 1/2006 | Florkey et al. |
| 7,058,659 B2 | 6/2006 | Ryu |
| 7,076,797 B2 | 7/2006 | Loveland |
| 7,096,030 B2 | 8/2006 | Huomo |
| 7,142,848 B2 | 11/2006 | Owen et al. |
| 7,161,914 B2 | 1/2007 | Shoaib et al. |
| 7,171,557 B2 | 1/2007 | Kallahalla et al. |
| 7,200,394 B2 | 4/2007 | Aoki et al. |
| 7,212,613 B2 | 5/2007 | Kim et al. |
| 7,222,360 B1 | 5/2007 | Miller |
| 7,272,388 B2 | 9/2007 | Andrew et al. |
| 7,274,925 B2 | 9/2007 | Chaar et al. |
| 7,302,272 B2 | 11/2007 | Ackley |
| 7,305,284 B2 | 12/2007 | Teshima et al. |
| 7,308,255 B2 | 12/2007 | Loveland |
| 7,321,774 B1 | 1/2008 | Lau et al. |
| 7,346,921 B2 | 3/2008 | Murren et al. |
| 7,353,234 B2 | 4/2008 | Kimball et al. |
| 7,359,713 B1 | 4/2008 | Tiwari |
| 7,366,795 B2 | 4/2008 | O'Neil et al. |
| 7,366,798 B2 | 4/2008 | Nordstrom et al. |
| 7,397,908 B2 | 7/2008 | Janssen |
| 7,408,506 B2 | 8/2008 | Miller |
| 7,471,929 B2 | 12/2008 | Fujioka et al. |
| 7,530,099 B2 | 5/2009 | Flurry et al. |
| 7,561,063 B2 | 7/2009 | Eckhart |
| 7,565,157 B1 | 7/2009 | Ortega et al. |
| 7,629,891 B1 | 12/2009 | Bell |
| 7,634,455 B1 | 12/2009 | Keene et al. |
| 7,639,131 B2 | 12/2009 | Mock et al. |
| 7,657,849 B2 | 2/2010 | Chaudhri et al. |
| 7,668,830 B1 | 2/2010 | Hakala |
| 7,680,882 B2 | 3/2010 | Tiu, Jr. et al. |
| 7,714,778 B2 | 5/2010 | Dupray |
| 7,796,944 B2 | 9/2010 | Eaton et al. |
| 7,809,350 B2 | 10/2010 | Buckley et al. |
| 7,818,412 B2 | 10/2010 | Krause et al. |
| 7,869,792 B1 | 1/2011 | Zhou et al. |
| 7,898,428 B2 | 3/2011 | Dietz et al. |
| 7,958,562 B2 | 6/2011 | Gaucas |
| 7,961,651 B2 | 6/2011 | Kim et al. |
| 7,962,156 B2 | 6/2011 | Robertson et al. |
| 8,024,112 B2 | 9/2011 | Krumm et al. |
| 8,036,677 B2 | 10/2011 | Khan |
| 8,046,839 B2 | 10/2011 | Lo |
| 8,112,755 B2 | 2/2012 | Apacible et al. |
| 8,144,920 B2 | 3/2012 | Kansal et al. |
| 8,185,599 B2 | 5/2012 | Kansal et al. |
| 8,228,234 B2 | 7/2012 | Paulson et al. |
| 8,244,272 B2 | 8/2012 | Morgan et al. |
| 8,258,748 B2 | 9/2012 | Constien et al. |
| 8,275,352 B2 | 9/2012 | Forstall et al. |
| 8,311,730 B2 | 11/2012 | Neff |
| 8,320,931 B2 | 11/2012 | Ward et al. |
| 8,331,899 B2 | 12/2012 | Broms |
| 8,355,751 B2 | 1/2013 | Dietz et al. |
| 8,385,039 B2 | 2/2013 | Rothkopf |
| 8,433,334 B2 | 4/2013 | Haung et al. |
| 8,437,779 B2 | 5/2013 | Phukan |
| 8,477,139 B2 | 7/2013 | Robinet et al. |
| 8,549,657 B2 | 10/2013 | Karlson et al. |
| 8,565,820 B2 | 10/2013 | Riemer et al. |
| 8,626,136 B2 | 1/2014 | Ozzie et al. |
| 8,639,803 B2 | 1/2014 | Mortiz et al. |
| 8,657,743 B2* | 2/2014 | Rietzel et al. ............... 600/301 |
| 8,660,531 B2 | 2/2014 | Hymel |
| 8,706,172 B2 | 4/2014 | Priyantha et al. |
| 8,732,822 B2 | 5/2014 | Schechter et al. |
| 8,751,582 B1 | 6/2014 | Behforooz et al. |
| 8,826,013 B1 | 9/2014 | Kodukula et al. |
| 8,874,162 B2 | 10/2014 | Schrader et al. |
| 8,907,772 B1 | 12/2014 | Green et al. |
| 8,918,119 B2 | 12/2014 | Kim et al. |
| 9,019,077 B2* | 4/2015 | Hazzani ............... H04W 4/02 340/8.1 |
| 9,027,117 B2 | 5/2015 | Wilairat et al. |
| 9,066,234 B2 | 6/2015 | Karlson et al. |
| 9,189,252 B2 | 11/2015 | Chu et al. |
| 9,230,076 B2 | 1/2016 | King et al. |
| 9,420,432 B2 | 8/2016 | Matthews et al. |
| 9,710,982 B2 | 7/2017 | Dolly et al. |
| 2001/0005681 A1 | 6/2001 | Kim |
| 2001/0039587 A1 | 11/2001 | Uhler et al. |
| 2002/0026478 A1 | 2/2002 | Rodgers |
| 2002/0044149 A1 | 4/2002 | McCarthy et al. |
| 2002/0160764 A1* | 10/2002 | Gorsuch ............... G06Q 30/06 455/419 |
| 2002/0183056 A1 | 12/2002 | Lundblade et al. |
| 2003/0003907 A1 | 1/2003 | Lai et al. |
| 2003/0139192 A1 | 7/2003 | Chmaytelli et al. |
| 2003/0154293 A1 | 8/2003 | Zmolek |
| 2003/0187803 A1 | 10/2003 | Pitt |
| 2004/0007916 A1 | 1/2004 | Awada et al. |
| 2004/0015940 A1 | 1/2004 | Heisey et al. |
| 2004/0039909 A1 | 2/2004 | Cheng |
| 2004/0166878 A1 | 8/2004 | Erskine et al. |
| 2004/0192352 A1 | 9/2004 | Vallstrom et al. |
| 2004/0193813 A1 | 9/2004 | Nguyen et al. |
| 2004/0203576 A1 | 10/2004 | Droste et al. |
| 2004/0243812 A1 | 12/2004 | Yui et al. |
| 2005/0012640 A1 | 1/2005 | Kong et al. |
| 2005/0037775 A1 | 2/2005 | Moeglein et al. |
| 2005/0055567 A1 | 3/2005 | Libin et al. |
| 2005/0059418 A1 | 3/2005 | Northcutt |
| 2005/0070276 A1 | 3/2005 | McGarry |
| 2005/0107114 A1 | 5/2005 | Ocock et al. |
| 2005/0138110 A1 | 6/2005 | Redlich et al. |
| 2005/0143171 A1 | 6/2005 | Loose |
| 2005/0210104 A1 | 9/2005 | Torvinen |
| 2005/0222768 A1* | 10/2005 | Tauchi et al. ............... 701/214 |
| 2006/0046706 A1 | 3/2006 | Lin et al. |
| 2006/0053389 A1 | 3/2006 | Michelman |
| 2006/0099969 A1 | 5/2006 | Staton et al. |
| 2006/0136998 A1 | 6/2006 | Oowaki et al. |
| 2006/0155664 A1 | 7/2006 | Morikawa et al. |
| 2006/0183486 A1 | 8/2006 | Mullen |
| 2006/0246872 A1 | 11/2006 | Tarkkala |
| 2006/0253570 A1 | 11/2006 | Biswas et al. |
| 2006/0256005 A1 | 11/2006 | Thandu et al. |
| 2006/0271797 A1 | 11/2006 | Ginggen et al. |
| 2006/0277271 A1 | 12/2006 | Morse et al. |
| 2006/0293057 A1 | 12/2006 | Mazerski et al. |
| 2007/0028176 A1 | 2/2007 | Perdomo et al. |
| 2007/0032225 A1 | 2/2007 | Konicek et al. |
| 2007/0042790 A1 | 2/2007 | Mohi et al. |
| 2007/0046423 A1 | 3/2007 | Baucom |
| 2007/0046456 A1 | 3/2007 | Edwards et al. |
| 2007/0049290 A1 | 3/2007 | Mullen |
| 2007/0064882 A1 | 3/2007 | Ger et al. |
| 2007/0067655 A1 | 3/2007 | Shuster |
| 2007/0072616 A1 | 3/2007 | Irani |
| 2007/0073832 A1 | 3/2007 | Curtis et al. |
| 2007/0082707 A1 | 4/2007 | Flynt et al. |
| 2007/0091037 A1 | 4/2007 | Lee |
| 2007/0111726 A1 | 5/2007 | Lanbert et al. |
| 2007/0150826 A1 | 6/2007 | Anzures et al. |

(56) References Cited

U.S. PATENT DOCUMENTS

| | | |
|---|---|---|
| 2007/0150842 A1 | 6/2007 | Chaudhri et al. |
| 2007/0168971 A1 | 7/2007 | Royzen et al. |
| 2007/0180509 A1 | 8/2007 | Swartz et al. |
| 2007/0218938 A1 | 9/2007 | Carter |
| 2007/0245398 A1 | 10/2007 | Roden |
| 2007/0264981 A1 | 11/2007 | Miller |
| 2007/0275767 A1 | 11/2007 | Steele |
| 2007/0281689 A1 | 12/2007 | Altman et al. |
| 2007/0300140 A1 | 12/2007 | Makela et al. |
| 2008/0005695 A1 | 1/2008 | Ozzie et al. |
| 2008/0014964 A1* | 1/2008 | Sudit et al. ............... 455/456.1 |
| 2008/0020803 A1 | 1/2008 | Rios et al. |
| 2008/0032703 A1 | 2/2008 | Krumm et al. |
| 2008/0045232 A1 | 2/2008 | Cone |
| 2008/0051079 A1 | 2/2008 | Forsgren |
| 2008/0070593 A1 | 3/2008 | Altman et al. |
| 2008/0080688 A1 | 4/2008 | Burgan et al. |
| 2008/0082693 A1 | 4/2008 | Meijer et al. |
| 2008/0096518 A1 | 4/2008 | Mock et al. |
| 2008/0096519 A1 | 4/2008 | Miegel |
| 2008/0101658 A1 | 5/2008 | Ahern et al. |
| 2008/0104225 A1 | 5/2008 | Zhang et al. |
| 2008/0111698 A1 | 5/2008 | Atherton |
| 2008/0126441 A1 | 5/2008 | Giampaolo et al. |
| 2008/0132252 A1 | 6/2008 | Altman et al. |
| 2008/0133708 A1 | 6/2008 | Alvarado et al. |
| 2008/0140650 A1 | 6/2008 | Stackpole |
| 2008/0154780 A1 | 6/2008 | Soukup et al. |
| 2008/0184127 A1 | 7/2008 | Rafey et al. |
| 2008/0227473 A1 | 9/2008 | Haney |
| 2008/0244005 A1 | 10/2008 | Sengupta et al. |
| 2008/0249969 A1 | 10/2008 | Tsui et al. |
| 2008/0254767 A1 | 10/2008 | Jin |
| 2008/0256170 A1 | 10/2008 | Hayashi et al. |
| 2008/0268870 A1 | 10/2008 | Houri |
| 2008/0305808 A1 | 12/2008 | Chan et al. |
| 2008/0311947 A1 | 12/2008 | Soerensen et al. |
| 2008/0318595 A1 | 12/2008 | Rofougaran |
| 2008/0320087 A1 | 12/2008 | Horvitz et al. |
| 2009/0005061 A1 | 1/2009 | Ward et al. |
| 2009/0005080 A1 | 1/2009 | Forstall et al. |
| 2009/0006566 A1 | 1/2009 | Veeramachaneni et al. |
| 2009/0006991 A1 | 1/2009 | Lindberg et al. |
| 2009/0036102 A1 | 2/2009 | Ho |
| 2009/0045927 A1 | 2/2009 | Atella |
| 2009/0089886 A1 | 4/2009 | Cheng et al. |
| 2009/0093688 A1 | 4/2009 | Mathur |
| 2009/0116703 A1 | 5/2009 | Schultz |
| 2009/0119590 A1 | 5/2009 | Kondziela et al. |
| 2009/0125918 A1 | 5/2009 | Kansal et al. |
| 2009/0143082 A1 | 6/2009 | Begeja et al. |
| 2009/0157560 A1 | 6/2009 | Carter et al. |
| 2009/0158389 A1 | 6/2009 | Waltenberg et al. |
| 2009/0170532 A1 | 7/2009 | Lee et al. |
| 2009/0197617 A1 | 8/2009 | Jayanthi |
| 2009/0201896 A1 | 8/2009 | Davis et al. |
| 2009/0205041 A1 | 8/2009 | Michalske |
| 2009/0224867 A1 | 9/2009 | O'Shaughnessy et al. |
| 2009/0224931 A1 | 9/2009 | Dietz et al. |
| 2009/0224941 A1 | 9/2009 | Kansal et al. |
| 2009/0265794 A1 | 10/2009 | Apelqvist |
| 2009/0270034 A1 | 10/2009 | Suzuki |
| 2009/0278738 A1 | 11/2009 | Gopinath |
| 2009/0282473 A1 | 11/2009 | Karlson et al. |
| 2009/0298475 A1 | 12/2009 | Czaja et al. |
| 2009/0300525 A1 | 12/2009 | Jolliff et al. |
| 2010/0001967 A1 | 1/2010 | Yoo |
| 2010/0004005 A1 | 1/2010 | Pereira et al. |
| 2010/0010733 A1 | 1/2010 | Krumm |
| 2010/0020035 A1 | 1/2010 | Ryu et al. |
| 2010/0045519 A1* | 2/2010 | Lee .................. G01S 19/34 342/357.57 |
| 2010/0056124 A1 | 3/2010 | Keating et al. |
| 2010/0066821 A1 | 3/2010 | Rosener et al. |
| 2010/0069007 A1 | 3/2010 | Nagasawa |
| 2010/0070334 A1 | 3/2010 | Monteverde |
| 2010/0074450 A1 | 3/2010 | Liao |
| 2010/0082247 A1 | 4/2010 | Klein et al. |
| 2010/0090852 A1 | 4/2010 | Eitan et al. |
| 2010/0112955 A1 | 5/2010 | Krishnaswamy et al. |
| 2010/0115610 A1 | 5/2010 | Tredoux et al. |
| 2010/0127836 A1* | 5/2010 | Huang et al. ............... 340/10.5 |
| 2010/0127919 A1 | 5/2010 | Curran et al. |
| 2010/0130229 A1 | 5/2010 | Sridhara et al. |
| 2010/0134310 A1 | 6/2010 | Zheng et al. |
| 2010/0162180 A1 | 6/2010 | Dunnam et al. |
| 2010/0167714 A1 | 7/2010 | Howarter et al. |
| 2010/0190479 A1 | 7/2010 | Scott et al. |
| 2010/0210301 A1 | 8/2010 | Dietz et al. |
| 2010/0216509 A1 | 8/2010 | Riemer et al. |
| 2010/0217646 A1 | 8/2010 | Siegel |
| 2010/0227588 A1 | 9/2010 | Bradley |
| 2010/0231383 A1 | 9/2010 | Levine et al. |
| 2010/0235881 A1 | 9/2010 | Liu et al. |
| 2010/0253503 A1 | 10/2010 | Juang |
| 2010/0255856 A1 | 10/2010 | Kansal et al. |
| 2010/0268779 A1 | 10/2010 | Rao |
| 2010/0285815 A1* | 11/2010 | Treu et al. ................. 455/456.1 |
| 2010/0291950 A1 | 11/2010 | Lin et al. |
| 2010/0302028 A1 | 12/2010 | Desai et al. |
| 2010/0306705 A1 | 12/2010 | Nilsson |
| 2010/0306832 A1 | 12/2010 | Mu et al. |
| 2010/0311336 A1 | 12/2010 | Huotari et al. |
| 2010/0313050 A1 | 12/2010 | Harrat et al. |
| 2010/0321155 A1 | 12/2010 | Ballard |
| 2010/0323715 A1 | 12/2010 | Winters |
| 2010/0324819 A1* | 12/2010 | Nurminen et al. ........... 701/213 |
| 2010/0325194 A1 | 12/2010 | Williamson et al. |
| 2011/0010340 A1 | 1/2011 | Hung et al. |
| 2011/0014933 A1 | 1/2011 | Karmarkar et al. |
| 2011/0021213 A1 | 1/2011 | Carr |
| 2011/0021234 A1 | 1/2011 | Tibbitts et al. |
| 2011/0028138 A1 | 2/2011 | Davies-Moore et al. |
| 2011/0047484 A1 | 2/2011 | Mount et al. |
| 2011/0063098 A1 | 3/2011 | Fischer et al. |
| 2011/0063138 A1 | 3/2011 | Berkobin et al. |
| 2011/0065419 A1 | 3/2011 | Book et al. |
| 2011/0068923 A1 | 3/2011 | Burket et al. |
| 2011/0070829 A1 | 3/2011 | Griffin et al. |
| 2011/0078758 A1 | 3/2011 | Kohlenberg et al. |
| 2011/0093161 A1 | 4/2011 | Zhou et al. |
| 2011/0111728 A1 | 5/2011 | Ferguson et al. |
| 2011/0111772 A1 | 5/2011 | Tysowski |
| 2011/0140956 A1* | 6/2011 | Henry .................. G01S 19/34 342/357.3 |
| 2011/0151839 A1 | 6/2011 | Bolon et al. |
| 2011/0151890 A1 | 6/2011 | Platt et al. |
| 2011/0167342 A1 | 7/2011 | De La Pena et al. |
| 2011/0167344 A1 | 7/2011 | Pan |
| 2011/0169654 A1 | 7/2011 | Ketari |
| 2011/0171958 A1 | 7/2011 | Hua et al. |
| 2011/0197160 A1 | 8/2011 | Kim et al. |
| 2011/0208430 A1 | 8/2011 | Tun et al. |
| 2011/0211511 A1 | 9/2011 | Bakthavathsalu et al. |
| 2011/0215903 A1* | 9/2011 | Yang et al. ................... 340/8.1 |
| 2011/0215952 A1 | 9/2011 | Aria et al. |
| 2011/0237221 A1 | 9/2011 | Prakash et al. |
| 2011/0241827 A1 | 10/2011 | Varoglu |
| 2011/0244837 A1 | 10/2011 | Murata et al. |
| 2011/0247045 A1 | 10/2011 | Rajagopal et al. |
| 2011/0250840 A1 | 10/2011 | Lee et al. |
| 2011/0254792 A1 | 10/2011 | Waters et al. |
| 2011/0264246 A1 | 10/2011 | Pantoja et al. |
| 2011/0267171 A1* | 11/2011 | Li et al. ......................... 340/8.1 |
| 2011/0275321 A1 | 11/2011 | Zhou et al. |
| 2011/0276901 A1 | 11/2011 | Zambetti |
| 2011/0283185 A1 | 11/2011 | Obasanjo et al. |
| 2011/0283241 A1 | 11/2011 | Miller et al. |
| 2011/0283311 A1 | 11/2011 | Luong |
| 2011/0285271 A1 | 11/2011 | Krumm et al. |
| 2011/0294520 A1 | 12/2011 | Zhou et al. |
| 2011/0299422 A1* | 12/2011 | Kim et al. ..................... 370/253 |
| 2011/0307166 A1* | 12/2011 | Hiestermann et al. ........ 701/119 |
| 2011/0319051 A1 | 12/2011 | Reitnour |

(56) References Cited

U.S. PATENT DOCUMENTS

| | | |
|---|---|---|
| 2011/0319094 A1 | 12/2011 | Usui et al. |
| 2011/0320518 A1 | 12/2011 | Tsui et al. |
| 2012/0008526 A1 | 1/2012 | Boutaghou |
| 2012/0023573 A1 | 1/2012 | Jianxiong |
| 2012/0046020 A1 | 2/2012 | Tomasini |
| 2012/0046040 A1 | 2/2012 | Chatterjee |
| 2012/0084691 A1 | 4/2012 | Yun |
| 2012/0084734 A1 | 4/2012 | Wilairat |
| 2012/0084737 A1 | 4/2012 | Gimpl et al. |
| 2012/0089217 A1 | 4/2012 | Mews et al. |
| 2012/0098768 A1 | 4/2012 | Bendewald et al. |
| 2012/0100895 A1 | 4/2012 | Priyantha et al. |
| 2012/0115512 A1* | 5/2012 | Grainger et al. .......... 455/456.3 |
| 2012/0136689 A1 | 5/2012 | Ickman et al. |
| 2012/0144468 A1 | 6/2012 | Pratt et al. |
| 2012/0146850 A1* | 6/2012 | Liu et al. ................. 342/357.42 |
| 2012/0158289 A1 | 6/2012 | Brush et al. |
| 2012/0166452 A1 | 6/2012 | Tseng |
| 2012/0166548 A1 | 6/2012 | Gropper |
| 2012/0172027 A1 | 7/2012 | Partheesh et al. |
| 2012/0234058 A1* | 9/2012 | Neil et al. .......................... 70/91 |
| 2012/0242470 A1 | 9/2012 | Morgan et al. |
| 2012/0242906 A1* | 9/2012 | Shintani et al. .............. 348/730 |
| 2012/0244883 A1 | 9/2012 | Tibbitts et al. |
| 2012/0245838 A1 | 9/2012 | Van Doorselaer |
| 2012/0252418 A1 | 10/2012 | Kandekar et al. |
| 2012/0282887 A1 | 11/2012 | Khoo et al. |
| 2012/0284256 A1 | 11/2012 | Mahajan et al. |
| 2012/0284297 A1 | 11/2012 | Aguera-Arcas et al. |
| 2012/0284769 A1 | 11/2012 | Dixon et al. |
| 2012/0289217 A1 | 11/2012 | Riemer et al. |
| 2012/0289244 A1* | 11/2012 | Goyal ................... H04W 12/08 455/456.1 |
| 2012/0295645 A1 | 11/2012 | Yariv et al. |
| 2012/0302256 A1 | 11/2012 | Pai et al. |
| 2012/0302258 A1 | 11/2012 | Pai et al. |
| 2012/0302556 A1 | 11/2012 | Pai et al. |
| 2012/0306637 A1 | 12/2012 | McGough et al. |
| 2012/0306699 A1 | 12/2012 | Schlesinger et al. |
| 2012/0309413 A1 | 12/2012 | Grosman et al. |
| 2012/0311499 A1 | 12/2012 | Dellinger et al. |
| 2012/0317162 A1 | 12/2012 | Endsley et al. |
| 2013/0006469 A1 | 1/2013 | Green et al. |
| 2013/0006522 A1 | 1/2013 | Vellaikal et al. |
| 2013/0018581 A1 | 1/2013 | Sidhu |
| 2013/0023246 A9 | 1/2013 | Ellingham et al. |
| 2013/0031169 A1 | 1/2013 | Axelrod et al. |
| 2013/0031601 A1 | 1/2013 | Bott |
| 2013/0036211 A1 | 2/2013 | Messer et al. |
| 2013/0040629 A1 | 2/2013 | Sprigg et al. |
| 2013/0040654 A1 | 2/2013 | Parish |
| 2013/0040711 A1 | 2/2013 | Kim et al. |
| 2013/0045760 A1 | 2/2013 | Obermeyer et al. |
| 2013/0055348 A1 | 2/2013 | Strauss et al. |
| 2013/0065613 A1 | 3/2013 | Stopel et al. |
| 2013/0072172 A1 | 3/2013 | Chang et al. |
| 2013/0072226 A1 | 3/2013 | Thramann |
| 2013/0084847 A1 | 4/2013 | Tibbitts et al. |
| 2013/0085861 A1 | 4/2013 | Dunlap |
| 2013/0093707 A1 | 4/2013 | Park et al. |
| 2013/0099977 A1 | 4/2013 | Sheshadri et al. |
| 2013/0130742 A1 | 5/2013 | Dietz et al. |
| 2013/0138334 A1 | 5/2013 | Meredith et al. |
| 2013/0158867 A1 | 6/2013 | Sidhu et al. |
| 2013/0173513 A1 | 7/2013 | Chu et al. |
| 2013/0188503 A1* | 7/2013 | Anepu et al. ................. 370/252 |
| 2013/0217416 A1 | 8/2013 | Matthews, III |
| 2013/0225151 A1 | 8/2013 | King |
| 2013/0225152 A1 | 8/2013 | Matthews, III |
| 2013/0227431 A1 | 8/2013 | Vasudevan |
| 2013/0232552 A1 | 9/2013 | Brush et al. |
| 2013/0295872 A1 | 11/2013 | Guday et al. |
| 2013/0295913 A1 | 11/2013 | Matthews, III et al. |
| 2013/0295970 A1 | 11/2013 | Sheshadri et al. |
| 2013/0298037 A1 | 11/2013 | Matthews |
| 2013/0303143 A1 | 11/2013 | Schrader |
| 2013/0305354 A1 | 11/2013 | King et al. |
| 2014/0024354 A1 | 1/2014 | Haik et al. |
| 2014/0068755 A1 | 3/2014 | King |
| 2014/0167961 A1 | 6/2014 | Finlow-Bates |
| 2014/0213295 A1 | 7/2014 | Conklin |
| 2014/0278054 A1 | 9/2014 | Tidd et al. |
| 2014/0370909 A1 | 12/2014 | Natucci, Jr. et al. |
| 2014/0370910 A1 | 12/2014 | Natucci, Jr. et al. |
| 2014/0370911 A1 | 12/2014 | Gorgenyi et al. |
| 2015/0011203 A1 | 1/2015 | Schrader |
| 2015/0213252 A1 | 7/2015 | Wilairat |
| 2015/0220712 A1 | 8/2015 | King et al. |
| 2015/0286840 A1 | 10/2015 | Karlson et al. |
| 2016/0007151 A1 | 1/2016 | Birch et al. |
| 2016/0197968 A1 | 7/2016 | Vasudevan et al. |
| 2016/0248906 A1 | 8/2016 | Schrader et al. |
| 2016/0328902 A1 | 11/2016 | Matthews et al. |

FOREIGN PATENT DOCUMENTS

| | | |
|---|---|---|
| CN | 101251589 | 8/2008 |
| CN | 101617304 | 12/2009 |
| CN | 101778165 | 7/2010 |
| CN | 101828162 | 9/2010 |
| CN | 102006550 | 4/2011 |
| CN | 102204374 | 4/2011 |
| EP | 2169946 | 3/2010 |
| EP | 2293016 | 3/2011 |
| EP | 2369864 | 9/2011 |
| EP | 2451139 | 5/2012 |
| EP | 2469442 | 6/2012 |
| JP | 07203015 | 8/1995 |
| JP | 2002142010 | 5/2002 |
| JP | 2002530783 | 9/2002 |
| JP | 2003032353 | 1/2003 |
| JP | 2004152276 | 5/2004 |
| JP | 2005043355 | 2/2005 |
| JP | 3669702 | 7/2005 |
| JP | 2007257140 | 10/2007 |
| JP | 2009521753 | 6/2009 |
| JP | 2009171160 | 7/2009 |
| JP | 2010503082 | 1/2010 |
| JP | 2010518416 | 5/2010 |
| JP | 2010286924 | 12/2010 |
| JP | 2012247366 | 12/2012 |
| KR | 20050037613 | 4/2005 |
| KR | 20100083396 | 7/2010 |
| KR | 20110119283 | 2/2011 |
| KR | 20110093528 | 8/2011 |
| RU | 2354990 | 5/2009 |
| WO | WO-2005031544 | 4/2005 |
| WO | WO-2006054858 | 5/2006 |
| WO | WO-2006088273 | 8/2006 |
| WO | WO-2006099535 | 9/2006 |
| WO | WO-2007130123 | 11/2007 |
| WO | WO-2009016505 | 2/2009 |
| WO | WO-2009105666 | 8/2009 |
| WO | WO-2009152472 | 12/2009 |
| WO | WO-2010103584 | 9/2010 |
| WO | WO-2011035390 | 3/2011 |
| WO | WO-2011135359 | 11/2011 |
| WO | WO-2012047412 | 4/2012 |
| WO | 2012/096603 A1 | 7/2012 |
| WO | WO-2013056145 | 4/2013 |
| WO | WO-2013061156 | 5/2013 |

OTHER PUBLICATIONS

"Final Office Action", U.S. Appl. No. 12/417,752, dated Feb. 25, 2014, 22 pages.

"Final Office Action", U.S. Appl. No. 12/912,456, (dated Sep. 6, 2013), 22 pages.

"PCT Search Report and Written Opinion", Application No. PCT/US2012/070431, (dated May 31, 2013),10 pages.

"International Search Report", dated Oct. 12, 2012, Application No. PCT/US2012/034598, dated Apr. 21, 2012, pp. 9.

(56) References Cited

OTHER PUBLICATIONS

"Non-Final Office Action", U.S. Appl. No. 13/726,095, dated Jan. 5, 2015, 14 pages.
"Non-Final Office Action", U.S. Appl. No. 13/409,905, dated Nov. 3, 2014, 14 pages.
"Non-Final Office Action", U.S. Appl. No. 13/918,776, dated Oct. 22, 2014, 18 pages.
"Non-Final Office Action", U.S. Appl. No. 13/918,818, dated Nov. 20, 2014, 18 pages.
"Non-Final Office Action", U.S. Appl. No. 13/918,810, dated Nov. 3, 2014, 19 pages.
"How can I see a list of all users on the logon screen?", Retrieved from <http://superuser.com/questions/354856/how-can-i-see-a-list-of-all-users-on-the-logon-screen> on Jan. 6, 2015, Nov. 7, 2011, 2 pages.
"How can one add an image to the windows 7 login screen? A", Retrieved from <http://superuser.com/questions/470568/how-can-one-add-an-image-to-the-windows-7-login-screen > on Jan. 6, 2015., Sep. 5, 2012, 4 pages.
"Timeline of Microsoft Windows", Retrieved from <http://en.wikipedia.org/wiki/Timeline_of_Microsoft_Windows> on Jan. 6, 2015, Dec. 14, 2014, 5 pages.
"Restrict Access to Programs with AppLocker in Windows 7", Retrieved from <http://www.howtogeek.com/howto/6317/block-users-from-using-certain-applications- with-applocker/> on Jan. 6, 2015., Nov. 12, 2009, 9 pages.
"Notice of Allowance", U.S. Appl. No. 13/340,702, dated Jul. 29, 2014, 10 Pages.
"Non-Final Office Action", U.S. Appl. No. 13/409,905, dated Apr. 1, 2013, 11 pages.
"Final Office Action", U.S. Appl. No. 13/409,905, dated Nov. 19, 2013, 13 Pages.
"International Search Report and Written Opinion", Application No. PCT/US2013/060500, dated Mar. 5, 2014, 10 pages.
"International Search Report and Written Opinion", Application No. PCT/US2013/050963, dated Nov. 8, 2013, 14 pages.
"Non-Final Office Action", U.S. Appl. No. 12/417,752, dated Feb. 25, 2014, 22 pages.
"Non-Final Office Action", U.S. Appl. No. 12/417,752, dated Oct. 29, 2013, 16 Pages.
"Non-Final Office Action", U.S. Appl. No. 13/340,702, dated Mar. 11, 2014, 15 Pages.
"Notice of Allowance", U.S. Appl. No. 12/912,456, dated Jan. 7, 2014, 9 Pages.
Boytsov, et al.,' "Context Prediction in Pervasive Computing Systems: Achievements and Challenges", International Journal on Computer Science and Engineering vol. 2, No. 4, 2010, 29 Pages.
Consolvo, et al.,' "Location Disclosure to Social Relations: Why, When, & What People Want to Share", Retrieved From: http://cens.ucla.edu/~mhr/cs219/privacy/consolvo05.pdf, Apr. 2-7, 2005, 11 Pages.
Harper, et al.,' "Glancephone—An Exploration of Human Expression", In MobileHCI09, Sep. 15-18, 2009, Bonn, Germany, 9 pages., Sep. 15-18, 2009, 10 Pages.
Makker, et al.,' "A Novel Approach for Predicting User Behavior for Improving Web Performance", International Journal on Computer Science and Engineering, vol. 2, No. 4, 2010, pp. 1233-1236., 2010, 4 Pages.
Schreiber, et al.,' "Reducing User Perceived Latency in Mobile Processes", IEEE International Conference on Web Services, 201 0, pp. 235-242., 2010, 18 Pages.
Schreiber, et al.,' "Reducing User Perceived Latency with a Middleware for Mobile SOA Access", IEEE International Conference on Web Services, 2009, pp. 366-373., 2009, 18 Pages.
Yan, et al.,' "Fast App Launching for Mobile Devices Using Predictive User Context", MobiSys'12, Jun. 25-29, 2012, Low Wood Bay, Lake District, UK., Jun. 25-29, 2012, 14 pages.
"Ignite Where & Launch Pad", O'Reilly, Where 2.0 Conference 2008, retrieved from <http://en.oreilly.com/where2008/public/schedule/detail/2572> on Feb. 5, 2009,(May 2008),4 pages.

"Non Final Office Action", U.S. Appl. No. 12/417,752, (dated Jun. 28, 2011),14 pages.
Aalto, Lauri et al., "Bluetooth and WAP Push Based Location-Aware Mobile Advertising System", ACM, MobiSYS '04, Jun. 6-9, 2004, Boston, MA, retrieved from <http://www.mediateam.oulu.fi/publications/pdf/496.pdf> on Feb. 5, 2009,(Jun. 6, 2004),10 pages.
Azizyan, Martin et al., "SurroundSense: Mobile Phone Localization Using Ambient Sound and Light", retrieved from <http://synrg.ee.duke.edu/papers/surroundsense-poster.pdf> on Feb. 5, 2009,(Sep. 22, 208),1 page.
Bahl, Paramvir et al., "Radar: An In-Building RF-based User Location and Tracking System", Microsoft Research, Proceedings of IEEE Infocom 2000, Tel-Aviv, Israel, retrieved from <https://3research.microsoft.com/en-us/um/people/padmanab/papers/infocom2000.pdf> on Feb. 5, 2009,(Mar. 2000),10 pages.
Balakrishnan, Hari et al., "ITR: Scalable Location-Aware Monitoring (SLAM) Systems", Laboratory for Computer Science & Department of EECS, MIT, Cambridge, MA, retrieved from <http://nms.lcs.mit.edu/projects/slam/prop.pdf> on Feb. 5, 2009,(Nov. 9, 2001),31 pages.
Constandache, et al., "Energy-Aware Localization Using Mobile Phones", retrieved from <http://www.cs.duke.edu/~ionut/2008_mobisys.pdf> on Feb. 5, 2009,(Jun. 2008),1 page.
Flinn, Jason "Extending Mobile Computer Battery Life through Energy-Aware Adaptation", School of Computer Science, Carnegie Mellon University, Pittsburgh, PA, retrieved from <http://reports-archive.adm.cs.cmu.edu/anon/2001/CMU-CS-01-171.pdf> from Feb. 5, 2009,(Dec. 2001),165 pages.
Gaonkar, Shravan et al., "Micro-Blog: Sharing and Querying Content through Mobile Phones and Social Participation", ACM, MobiSys 2008, Jun. 17-20, 2008, Breckenridge, CO, retrieved from <http://www.cs.duke.edu/~lpcox/romit-microblog.pdf> on Feb. 5, 2009,(Jun. 17, 2008),13 pages.
Kansal, Aman et al., "Location and Mobility in a Sensor Network of Mobile Phones", Microsoft Research, Microsoft Corporation, retrieved from <http://research.microsoft.com.com/apps/pubs/default.aspx?id=70416> on Feb. 5, 2009,(Jun. 4, 2007),1 pages.
Krumm, John et al., "Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitzlpredestination.pdf> on Feb. 5, 2009,(Sep. 17, 2006),18 pages.
Krumm, John et al., "RightSPOT: A Novel Sense of Location for a Smart Personal Object", Proceedings of Ubicomp 2003, Seattle, WA, retrieved from <http://research.microsoft.com/en-us/um/people/horvitz/rightspot.htm> on Feb. 5, 2009,(2003),1 pages.
Lamarca, Anthony et al., "Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009,(2005),18 pages.
Liao, Lin et al., "Extracting Places and Activities from GPS Traces Using Hierarchical Conditional Random Fields", The International Journal of Robotics Research, vol. 26, No. 1, 119-134, retrieved from <http://ijr.sagepub.com/cgi/content/26/1/119> on Feb. 5, 2009,(2007),20 pages.
Lin, Tsung-Han et al., "Enabling Energy-Efficient and Quality Localization Services", National Taiwan University, retrieved from <http://nslab.ee.ntu.edu.tw/publication/conf/qols-percom06.pdf> on Feb. 5, 2009,(2006),4 pages.
Peng, Chunyi et al., "BeepBeep: A High Accuracy Acoustic Acoustic Ranging System Using COTS Mobile Devices", ACM, SenSys 2007, Nov. 6-9, 2007, Sydney, Australia, retrieved from <http://research.microsoft.com/en-us/groups/wn/sensys106-beepbeep.pdf> on Feb. 5, 2009,(Nov. 6, 2007),14 pages.
Person, Jon "Writing Your Own GPS Applications: Part 2", The Code Project, retrieved from <http://www.codeproject.com/KB/mobile/WritingGPSApplications2.aspx> on Feb. 5, 2009,(Dec. 20, 2004),13 pages.
Ruairi, Ronan M., et al., "An Energy-Efficient, Multi-Agent Sensor Network for Detecting Diffuse Events", IJCAI-07, retrieved from

(56) References Cited

OTHER PUBLICATIONS

<http://www.aaai.org/Papers/IJCAI/2007/IJCAI07-224.pdf> on Feb. 5, 2009,(2007),pp. 1390-1395.

Schindler, Grant et al., "City-Scale Location Recognition", IEEE Computer Society Conference on Computer Vision and Pattern Recognition (CVPR), retrieved from <http://www.cc.gatech.edu/~phlosoft/files/schindler07cvpr2.pdf> on Feb. 5, 2009,(2007),7 pages.

Smailagic, Asim et al., "Location Sensing and Privacy in a Context-Aware Computing Environment", IEEE Wireless Communications, retrieved from <http://diuf.unifr.ch/pai/education/2002_2003/seminar/winter/telecom/01043849.pdf> on Feb. 5, 2009,(Oct. 2002),pp. 10-17.

Sun, Guolin et al., "Signal Processing Techniques in Network-aided Positioning", IEEE Signal Processing Magazine, Available at <http://www.cspl.umd.edu/sig/publications/sun_survey_200507.pdf>,(Jul. 2005),pp. 12-23.

Youssef, Moustafa et al., "The Horus WLAN Location Determination System", Department of Computer Science, University of Maryland, retrieved from <http://www.cs.umd.edu/~moustafa/papers/horus_usenix.pdf> on Feb. 5, 2009,(2005),14 pages.

Zhang, Kaifu et al., "The Two Facets of the Exploration-Exploitation Dilemma", Proceedings of the IEEE/WIC/ACM International Conference on Intelligent Agent Technology (IAT '06), retrieved from <http://ieeexplore.ieee.org/ielx5/4052878/4052879/04052945.pdf?tp=> on Feb. 5, 2009,(2006),7 pages.

"Calendar and Reminders Programming Guide", Apple, Inc., Available at <http://developer.apple.com/library/ios/documentation/DataManagement/Conceptual/EventKitProgGuide/EventKitProgGuide.pdf>,(Jul. 17, 2012), 25 pages.

"Final Office Action", U.S. Appl. No. 12/417,752, (dated Jul. 17, 2013),18 pages.

"Flextrack Lommy Phoenix platforms Technical Description Draft", Retrieved from <http://tayeb.fr/wiki_uploads/balise/FlextrackPhoenix_GT.pdf> on Apr. 15, 2013, pp. 1-36.

"Geo-fencing: Does geo-fencing in iOS 6 Poll your Location Multiple Times a Day?", Retrieved from <http://www.quora.com/Geo-fencing/Does-geo-fencing-in-iOS-6-poll-your-location-multiple-times-a-day> on Apr. 12, 2013, 2 pages.

"No Tech Panacea for Tech-Distracted Driving", http://mobile.slashdot.org/story/12/06/11/0556231/no-tech-panacea-for . . . , (Dec. 6, 2011), 30 Pages.

"Non-Final Office Action", U.S. Appl. No. 12/417,752, (dated May 24, 2013), 17 pages.

"Non-Final Office Action", U.S. Appl. No. 12/912,456, (dated May 29, 2013), 20 pages.

"PCT Search Report and Written Opinion", Application No. PCT/US2012/071562, (dated Apr. 24, 2013), 9 pages.

"To Create a Geo-fencing Policy for iOS Devices", Retrieved from <http://support.citrix.com/proddocs/topic/xmob-dm-8/xm-dm-manage-geofence-ios-tsk.html> on Apr. 12, 2013, (Feb. 8, 2013), 1 page.

"U.S. Application as Filed", U.S. Appl. No. 13/409,905, (dated Mar. 1, 2012), 44 pages.

"VIMOCOS—Vienna Mobile Context Sharing", Retrieved on Jan 2, 2012 from <<http://www.infosys.tuwien.ac.at/prototypes/VIMOCOS/VIMOCOS_index.html>>, 2 Pages.

Aleksy, Markus et al., "Techniques for Efficient Resource Management for Context-Sensitive Mobile Applications", International Conference on Complex Intelligent and Software Intensive Systems (CISIS), Retrieved at <<http://ieeexplore.ieee.org/stamp/stamp.jsp?tp=&arnumber=4606684>>,(Mar. 4, 2008), 6 Pages.

Balasubramanian, Niranjan et al., "Energy Consumption in Mobile Phones: A Measurement Study and Implications for Network Applications", Proceedings of the 9th ACM SIGCOMM conference on Internet measurement conference (IMC), Retrieved at <<http://www.cs.umass.edu/-arunab/paper/tailender-imc09.pdf>>,(Nov. 4, 2009), 14 Pages.

Branscombe, Mary "Kids Corner and Wallet", Retrieved from <http://www.techradar.com/reviews/pc-mac/software/operating-systems/windows-phone-8-1086692/review/6>, (Jan. 25, 2012), 7 pages.

Campbell, Mikey "Apple Brings Customizable Geofencing to Find My Friends in Update", Retrieved from <http://appleinsider.com/articles/13/03/28/apple-brings-customizable-geofencing-notifications-in-find-my-friends-update> on May 1, 2013, (Mar. 28, 2013), 5 pages.

Chu, David et al., "U.S. Application as Filed", U.S. Appl. No. 13/340,702, (dated Dec. 30, 2011), 60 pages.

Dandu, Ravi "Building Next Generation Location-Based Applications", UPLINQ 2012 Conference, Available at <https://www.uplinq.com/system/files/session/slides/Tapping_into_the_Next_Generation_wednesday_430.pdf>,(Jun. 27, 2012), 22 pages.

Domingos, et al., "Mining High-Speed Data Streams", Proceedings of the Sixth ACM SIGKDD International Conference on Knowledge Discovery and Data Mining, (2000), 10 Pages.

Gupta, Monika "Broadcom's Latest GPS Tech Zooms in on Geofencing", Retrieved from <http://blog.broadcom.com/mobile-wireless/ahead-of-mobile-world-congress-broadcoms-latest-gps-tech-zooms-in-on-geofencing/?utm_source=&utm_medium=&utm_campaign=> on May 1, 2013, (Feb. 19, 2013), 5 pages.

Israel, Shel "How VinTank is Building a Geo-Fence Around Wine Country", Retrieved from <http://www.forbes.com/sites/shelisrael/2013/03/20/how-vintank-is-building-a-geo-fence-around-wine-country/> on May 1, 2013, (Mar. 20, 2013), 7 pages.

Jacobs, Bart "Geofencing with Core Location", Retrieved from <http://mobile.tutsplus.com/tutorials/iphone/geofencing-with-core-location/> on May 1, 2013, (Mar. 18, 2013),11 pages.

Lee, et al., "Mobile Phone-To-Phone Personal Context Sharing", In Proceedings of 9th International Conference Communications and Information Technology, (Sep. 28, 2009), 6 Pages.

McGlaun, "Fixes for Distracted Driving Remain Unclear", http://www.dailytech.com/article.aspx?newsid=24903, (Jun. 12, 2012), 2 Pages.

Miluzzo, et al., "Sensing Meets Mobile Social Networks: The Designs, Implementation and Evaluation of the CenceMe Application", In Proceedings of the 6th ACM Conference on Embedded Network Sensor Systems, (Nov. 5, 2008),14 Pages.

Natili, Giorgio et al., "Web Caching and Web Prefetching", <<http://www.mobilerevamp.org/2011/08/22/web-caching-and-web-prefetching/>>, (Aug. 22, 2011), 5 Pages.

Oh, et al., "A Mobile Context Sharing System using Activity and Emotion Recognition with Bayesian Networks", In 7th International Conference on Ubiquitous Intelligence & Computing and 7th International Conference on Autonomic & Trusted Computing, (Oct. 26, 2010), 6 Pages.

Raento, et al., "Context Phone: A Prototyping Platform for Context-Aware Mobile Applications", In IEEE Pervasive Computing, vol. 4, Issue 2, (Apr. 2005), pp. 51-59.

Ravi, et al., "Context-aware Battery Management for Mobile Phones", Proceedings of the Sixth Annual IEEE International Conference on Pervasive Computing and Communications (PERCOM), Retrieved at <<http://www.cs.rutgers.edu/discolab/smartphone/papers/percom08.pdf>>,(2008),10 Pages.

Schreiber, et al., "Reducing User Perceived Latency with a Proactive Prefetching Middleware for Mobile SOA Access", International Journal of Web Services Research, vol. 8, No. 1, Retrieved from <<http://www.informatik.uni-trier.de/~ley/db/journals/jwsr/jwsr8.html>>,(2011),18 Pages.

Talbot, David "App Battles Driver Distraction but Spares Passengers", Technology Review India published by MIT, http://www.technologyreview.in/news/426889/app-battles-driver-distraction-but-spares-passengers,(Feb. 14, 2012), 2 pages.

"Non-Final Office Action", U.S. Appl. No. 13/726,095, dated Aug. 15, 2014, 12 pages.

Lifehacker, "Get the Most Out of Your iPhone's Notification Center, from Beginner to Jailbreaker", Available online at <http://lifehacker.com/5882947/get-the-most-out-of-ios-Ss-notification-center-frombeginner-to-jailbreakerl>, retrieved on Jul. 29, 2014, Feb. 7, 2012, 8 pages.

(56) References Cited

OTHER PUBLICATIONS

Osxdaily, "How to Use the lock Screen Camera in iOS 5.1", Available online at <http://osxdaily.com/2012/03/08/lock-screen-camera-ios-5-1>, retrieved on Jul. 29, 2014, Mar. 6, 2012, 9 pages.

"Ignite Where & Launch Pad", O'Reilly, Where 2.0 Conference 2008, retrieved from <http://en.oreilly.com/where2008/public/schedule/detail/2572> on Feb. 5, 2009,(May 2008), 4 pages.

"Non-Final Office Action", U.S. Appl. No. 12/417,752, (dated Jun. 28, 2011), 14 pages.

Azizyan, Martin et al., "SurroundSense: Mobile Phone Localization Using Ambient Sound and Light", retrieved from <http://synrg.ee.duke.edu/papers/surroundsense-poster.pdf> on Feb. 5, 2009,(Sep. 22, 208), 1 page.

Bahl, Paramvir et al., "Radar: An In-Building RF-based User Location and Tracking System", Microsoft Research, Proceedings of IEEE Infocom 2000, Tel-Aviv, Israel, retrieved from <https://3research.microsoft.com/en-us/um/people/padmanab/papers/infocom2000.pdf> on Feb. 5, 2009,(Mar. 2000), 10 pages.

Balakrishnan, Hari et al., "ITR: Scalable Location-Aware Monitoring (SLAM) Systems", Laboratory for Computer Science & Department of EECS, MIT, Cambridge, MA, retrieved from <http://nms.lcs.mit.edu/projects/slam/prop.pdf> on Feb. 5, 2009,(Nov. 9, 2001), 31 pages.

Constandache, et al., "Energy-Aware Localization Using Mobile Phones", retrieved from <http://www.cs.duke.edu/~ionut/2008_mobisys.pdf> on Feb. 5, 2009,(Jun. 2008), 1 page.

Flinn, Jason "Extending Mobile Computer Battery Life through Energy-Aware Adaptation", School of Computer Science, Carnegie Mellon University, Pittsburgh, PA, retrieved from <http://reports-archive.adm.cs.cmu.edu/anon/2001/CMU-CS-01-171.pdf> from Feb. 5, 2009,(Dec. 2001), 165 pages.

Gaonkar, Shravan et al., "Micro-Blog: Sharing and Querying Content through Mobile Phones and Social Participation", ACM, MobiSys 2008, Jun. 17-20, 2008, Breckenridge, CO, retrieved from <http://www.cs.duke.edu/~lpcox/romit-microblog.pdf> on Feb. 5, 2009,(Jun. 17, 2008), 13 pages.

Kansal, Aman et al., "Location and Mobility in a Sensor Network of Mobile Phones", Microsoft Research, Microsoft Corporation, retrieved from <http://research.microsoft.com.com/apps/pubs/default.aspx?id=70416> on Feb. 5, 2009,(Jun. 4, 2007), 1 pages.

Krumm, John et al., "Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitzlpredestination.pdf> on Feb. 5, 2009,(Sep. 17, 2006), 18 pages.

Krumm, John et al., "RightSPOT: A Novel Sense of Location for a Smart Personal Object", Proceedings of Ubicomp 2003, Seattle, WA, retrieved from <http://research.microsoft.com/en-us/um/people/horvitz/rightspot.htm> on Feb. 5, 2009,(2003), 1 pages.

Lamarca, Anthony et al., "Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009,(2005), 18 pages.

Liao, Lin et al., "Extracting Places and Activities from GPS Traces Using Hierarchical Conditional Random Fields", The International Journal of Robotics Research, vol. 26, No. 1, 119-134, retrieved from <http://ijr.sagepub.com/cgi/content/26/1/119> on Feb. 5, 2009,(2007), 20 pages.

Lin, Tsung-Han et al., "Enabling Energy-Efficient and Quality Localization Services", National Taiwan University, retrieved from <http://nslab.ee.ntu.edu.tw/publication/conf/qols-percom06.pdf> on Feb. 5, 2009,(2006), 4 pages.

Peng, Chunyi et al., "BeepBeep: A High Accuracy Acoustic Ranging System Using COTS Mobile Devices", ACM, SenSys 2007, Nov. 6-9, 2007, Sydney, Australia, retrieved from <http://research.microsoft.com/en-us/groups/wn/sensys106-beepbeep.pdf> on Feb. 5, 2009,(Nov. 6, 2007), 14 pages.

Person, Jon "Writing Your Own GPS Applications: Part 2", The Code Project, retrieved from <http://www.codeproject.com/KB/mobile/WritingGPSApplications2.aspx> on Feb. 5, 2009,(Dec. 20, 2004), 13 pages.

Ruairi, Ronan M., et al., "An Energy-Efficient, Multi-Agent Sensor Network for Detecting Diffuse Events", IJCAI-07, retrieved from <http://www.aaai.org/Papers/IJCAI/2007/IJCAI07-224.pdf> on Feb. 5, 2009,(2007), pp. 1390-1395.

Schindler, Grant et al., "City-Scale Location Recognition", IEEE Computer Society Conference on Computer Vision and Pattern Recognition (CVPR), retrieved from <http://www.cc.gatech.edu/~phlosoft/files/schindler07cypr2.pdf> on Feb. 5, 2009,(2007), 7 pages.

Smailagic, Asim et al., "Location Sensing and Privacy in a Context-Aware Computing Environment", IEEE Wireless Communications, retrieved from <http://diuf.unifr.ch/pai/education/2002_2003/seminar/winter/telecom/01043849.pdf> on Feb. 5, 2009,(Oct. 2002), pp. 10-17.

Sun, Guolin et al., "Signal Processing Techniques in Network-aided Positioning", IEEE Signal Processing Magazine, Available at <http://www.cspl.umd.edu/sig/publications/sun_survey_200507.pdf>,(Jul. 2005), pp. 12-23.

Youssef, Moustafa et al., "The Horus WLAN Location Determination System", Department of Computer Science, University of Maryland, retrieved from <http://www.cs.umd.edu/~moustafa/papers/horus_usenix.pdf> on Feb. 5, 2009,(2005), 14 pages.

Zhang, Kaifu et al., "The Two Facets of the Exploration-Exploitation Dilemma", Proceedings of the IEEE/WIC/ACM International Conference on Intelligent Agent Technology (IAT '06), retrieved from <http://ieeexplore.ieee.org/ielx5/4052878/4052879/04052945.pdf?tp=> on Feb. 5, 2009,(2006), 7 pages.

Zhuang, et al., "Improving Energy Efficiency of Location Sensing on Smartphones", Retrieved at <<http://www.deutsche-telekom-laboratories.com/~kyuhan/papers/MobiSys10Kim.pdf>>, The 8th International Conference on Mobile Systems, Applications and Services, Jun. 15-18, 2010, pp. 15.

"What's an Android? And Other Smart(phone) Questions", Retrieved at <<http://bestbuybusinessdistrict.com/knowlege-center/58-what%27s-an-android-and-other-smart-phone-questions>>, Sep. 6, 2010, pp. 4.

Constandache, et al., "Energy-efficient Localization Via Personal Mobility Profiling", Retrieved at <<http://synrg.ee.duke.edu/papers/mobicase09.pdf>>, 2009, pp. 1-20.

Lin, et al., "Energy-Accuracy Trade-off for Continuous Mobile Device Location", Retrieved at <<http://research.microsoft.com/apps/pubs/default.aspx?id=120831>>, The 8th International Conference on Mobile Systems, Applications and Services, Jun. 15-18, 2010, pp. 1-14.

"Final Office Action", U.S. Appl. No. 12/912,456, (dated Jan. 9, 2013), 21 pages.

"Final Office Action", U.S. Appl. No. 12/417,752, (dated Sep. 13, 2012),18 pages.

"Non-Final Office Action", U.S. Appl. No. 12/912,456, (dated May 4, 2012),14 pages.

"Non-Final Office Action", U.S. Appl. No. 12/912,456, (dated Sep. 11, 2012),15 pages.

Abdelzaher, et al., "Mobiscopes for Human Spaces", IEEE Pervasive Computing, vol. 6, No. 2, (Apr. 2007),11 pages.

Abdesslem, et al., "Less is More: Energy-Efficient Mobile Sensing with SenseLess", MobiHeld an ACM SIGCOMM workshop, (Aug. 17, 2009),pp. 61-62.

Agarwal, Yuvraj et al., "Somniloquy: Augmenting Network Interfaces to Reduce PC Energy Usage", Symposium on Networked Systems Design and Implementation (NSDI), 2009, available at <http://www.usenix.org/events/nsdi09/tech/full_papers/agarwal/agarwal.pdf>,(Apr. 23, 2009), pp. 365-380.

Barroso, et al., "The Case for Energy-Proportional Computing", IEEE Computer Society, vol. 40. No. 12, (Dec. 2007),pp. 33-37.

Burke, et al., "Participatory Sensing", WSW at SenSys, (Oct. 31, 2006),5 pages.

Chiu, et al., "Playful Bottle: A Mobile Social Persuasion System to Motivate Healthy Water Intake", Proceedings of the 11th international conference on Ubiquitous computing, (2009),10 pages.

(56) References Cited

OTHER PUBLICATIONS

Consolvo, "Flowers or a Robot Army?: Encouraging Awareness & Activity with Personal, Mobile Displays", Proceedings of the 10th International Conference on Ubiquitous Computing, vol. 12, No. 4, Publisher: ACM Press, (Sep. 2008),10 pages.
Foster, et al., "Precision and accuracy of an ankle-worn accelerometer-based pedometer in step counting and", Preventive Medicine, vol. 41, No. 3-4, (Oct. 2005),pp. 778-783.
Hoh, et al., "Virtual Trip Lines for Distributed Privacy-Preserving Traffic Monitoring",, Proceedings of the 6th International Conference on Mobile Systems, Applications, and Services, (Jun. 2008),14 pages.
Hull, et al., "CarTel: A Distributed Mobile Sensor Computing System", Proceedings of the 4th international conference on Embedded networked sensor systems, (Nov. 2006),14 pages.
Kang, et al., "A Scalable and Energy-Efficient Context Monitoring Framework for Mobile Personal Sensor Networks", IEEE Transactions on Mobile Computing, vol. 9, No. 5, (May 2010),pp. 686-702.
Lester, et al., "Validated Caloric Expenditure Estimation using a Single Body-Worn Sensor", Proceedings of the 11th international conference on Ubiquitous computing, (Oct. 2009),10 pages.
Lester, et al., "A Practical Approach to Recognizing Physical Activities", Pervasive Computing in Pervasive Computing, vol. 3968, (2006),17 pages.
Lu, et al., "Sound Sense: Scalable Sound Sensing for People-Centric Sensing Applications on Mobile Phones", Proceedings of the 7th international conference on Mobile systems, applications, and services, (Jun. 2009),14 pages.
Mohan, et al., "Nericell: Rich Monitoring of Road and Traffic Conditions using Mobile Smartphones", Proceedings of the 6th ACM conference on Embedded network sensor systems, (Nov. 2008),14 pages.
Oliver, et al., "Health Gear: A Real-Time Wearable System for Monitoring and Analyzing Physiological Signals", (Apr. 2006),pp. 1-4.
Paek, Jeongyeup et al., "Energy-Efficient Rate-Adaptive GPS-based Positioning for Smartphones", In Proceedings of MobiSys 2010, Available at <http://enl.usc.edu/papers/cache/Paek10a.pdf>,(Jun. 2010),16 pages.
Pering, et al., "The PSI Board: Realizing a Phone-Centric Body Sensor Network", In 4th International Workshop on Wearable and Implantable Body Sensor Networks, (2007),6 pages.
Riva, et al., "The Urbane! Revolution: Sensor Power to the People!", IEEE Pervasive Computing, vol. 6, No. 2, (Apr. 2007),pp. 41-49.
Shin, et al., "Deamon: Energy-efficient sensor monitoring", 6th Annual IEEE Communications Society Conference on Sensor, Mesh and Ad Hoc Communications and Networks, (Jun. 22, 2009),9 pages.
Wang, et al., "A Framework of Energy Efficient Mobile Sensing for Automatic User State Recognition", Proceedings o the 7th international conference on Mobile systems, applications, and services, (Jun. 2009),14 pages.
Woodman, et al., "Pedestrian Localization for Indoor Environments", Proceedings of the 10th international conference on Ubiquitous computing, (Sep. 2008),10 pages.
Yu, et al., "Personalized Awareness and Safety with Mobile Phones as Sources and Sinks", Proceedings of Urbansense, workshop held in conjunction with SenSys, (Nov. 4, 2008),pp. 26-30.
"Notice of Allowance", U.S. Appl. No. 13/726,095, dated Aug. 28, 2015, 6 pages.
"Apple—Batteries—iPhone", Available at: http://www.apple.com/batteries/maximizing-performance/, Dec. 29, 2011, 9 pages.
"Final Office Action", U.S. Appl. No. 13/409,905, dated Apr. 14, 2015, 17 Pages.
"Final Office Action", U.S. Appl. No. 13/726,095, dated May 8, 2015, 13 pages.
"Final Office Action", U.S. Appl. No. 13/918,776, dated Jun. 17, 2015, 23 pages.
"Final Office Action", U.S. Appl. No. 13/918,810, dated Jun. 3, 2015, 22 pages.
"Final Office Action", U.S. Appl. No. 13/918,818, dated Jun. 3, 2015, 22 pages.
"Foreign Office Action", CN Application No. 201210592889.8, dated May 6, 2015, 14 pages.
"Foreign Office Action", EP Application No. 12863619.8, dated May 13, 2015, 5 pages.
"International Preliminary Report on Patentability", Application No. PCT/US2012/070431, dated Jul. 10, 2014, 7 pages.
"Notice of Allowance", U.S. Appl. No. 13/340,702, dated Mar. 24, 2015, 12 Pages.
"Notice of Allowance", U.S. Appl. No. 13/340,702, dated Jul. 8, 2015, 8 pages.
"Supplementary European Search Report", EP Application No. 12863619.8, dated May 4, 2015, 4 pages.
Bohmer,"Falling Asleep with Angry Birds, Facebook and Kindle—A Large Scale Study on Mobile Application Usage", In Proceedings of the 13th International Conference on Human Computer Interaction with Mobile Devices and Services, Aug. 11, 2011, 11 pages.
Chu,"Mobile Apps: It's Time to Move Up to CondOS", In Proceedings of the 13th USENIX Conference on Hot Topics in Operating Systems, Apr. 15, 2011, 5 pages.
Kamisaka,"Operation Prediction for Context-Aware User Interfaces of Mobile Phones", 2009 Ninth Annual International Symposium on Applications and the Internet, 2009, 7 pages.
"International Search Report and Written Opinion", Application No. PCT/US2013/060501, dated Apr. 13, 2015, 19 Pages.
"iOS 5 slowing iPhone 4 and 4S complaints", Retrieved at: http://www.phonesreview.co.uk/2011/10/25/ios-5-slowing-iphone-4-and-4s-complaints/, Oct. 10, 2011, 2 pages.
"Link prefetching FAQ", Retrieved at: https://developer.mozilla.org/en-US/docs/Web/HTTP/Link_prefetching_FAQ, Mar. 3, 2003, 5 pages.
"Tasker", Retrieved from: https://web.archive.org/web/20101229145544/http://tasker.dinglisch.net/, Dec. 29, 2010, 2 pages.
Aggarwal,"Caching on the World Wide Web", IEEE Trans. Knowl. Data Eng., vol. 11, No. 1, 1999, 16 pages.
Garlan,"Project Aura: Toward Distraction-Free Pervasive Computing", IEEE Pervasive Computing, vol. 1, 2002, 10 pages.
Joo,"Fast: Quick Application Launch on Solid-State Drives", Proceedings of the 9th USENIX Conference on File and Storage Technologies, Available at <http://static.usenix.org/event/fast11/tech/full_papers/Joo.pdf>, Feb. 15, 2011, 14 pages.
Lymberopoulos,"PocketWeb: Instant Web Browsing for Mobile Devices", in ASPLOS'12, 2012, 12 pages.
"BroadCloud FamilyCenter", BroadSoft Data Sheet—retrieved from <http://www.broadsoft.com/pdf/datasheet-broadcloud-familycenter.pdf> on Dec. 13, 2011, 1 page.
"CameraLock Cydia Tweak—Add a Camera Button to Your Lockscreen Without iOS 5—iPhone & iPpd Touch", Retrieved from: https://www.youtube.com/watch?v=ECGm54OB6e0, Jun. 21, 2011, 1 page.
"Corrected Notice of Allowance", U.S. Appl. No. 13/726,097, dated Aug. 21, 2014, 2 pages.
"Corrected Notice of Allowance", U.S. Appl. No. 13/726,097, dated Oct. 1, 2014, 2 pages.
"Distracted Driving Information Clearinghouse", Retrieved from <http://www.fcc.gov/encyclopedia/distracted-driving-information-clearinghouse>, Jul. 27, 2011, 4 pages.
"EP Search Report", EP Application No. 09747072.8, dated Jan. 17, 2003, 5 Pages.
"Extended European Search Report", EP Application No. 12859600.4, dated May 13, 2015, 7 pages.
"Final Office Action", U.S. Appl. No. 12/194,213, dated Sep. 20, 2011, 11 Pages.
"Final Office Action", U.S. Appl. No. 12/897,586, dated May 22, 2013, 4 pages.
"Final Office Action", U.S. Appl. No. 13/222,538, dated May 28, 2013, 43 pages.

(56) References Cited

OTHER PUBLICATIONS

"Final Office Action", U.S. Appl. No. 13/726,027, dated Jan. 5, 2015, 19 pages.
"Final Office Action", U.S. Appl. No. 13/726,043, dated Mar. 3, 2015, 19 pages.
"Final Office Action", U.S. Appl. No. 13/726,090, dated Oct. 2, 2014, 30 pages.
"Final Office Action", U.S. Appl. No. 13/726,099, dated May 8, 2015, 11 pages.
"Final Office Action", U.S. Appl. No. 13/726,099, dated Aug. 29, 2014, 10 pages.
"Final Office Action", U.S. Appl. No. 13/875,139, dated May 9, 2014, 15 Pages.
"Final Office Action", U.S. Appl. No. 14/686,300, dated Jul. 29, 2015, 13 pages.
"Foreign Notice of Allowance", AU Application No. 2011312743, dated Nov. 25, 2014, 2 Pages.
"Foreign Notice of Allowance", CN Application No. 200980128048.8, dated Jun. 19, 2014, 4 Pages.
"Foreign Office Action", AU Application No. 2011312743, dated Aug. 15, 2014, 4 Pages.
"Foreign Office Action", AU Application No. 2011312743, dated Jun. 20, 2014, 4 Pages.
"Foreign Office Action", CL Application No. 201300886, dated Feb. 2, 2015, 7 pages.
"Foreign Office Action", CL Application No. 201300886, dated May 13, 2015, 7 pages.
"Foreign Office Action", CN Application No. 200980128048.8, dated May 6, 2013, 7 Pages.
"Foreign Office Action", CN Application No. 200980128048.8, dated Dec. 2, 2013, 7 pages.
"Foreign Office Action", CN Application No. 200980128048.8, dated Dec. 19, 2012, 11 Pages.
"Foreign Office Action", CN Application No. 201110317851.5, dated May 20, 2015, 8 pages.
"Foreign Office Action", CN Application No. 201110317851.5, dated Nov. 14, 2014, 15 Pages.
"Foreign Office Action", CN Application No. 201110317851.5, dated Dec. 4, 2013, 14 pages.
"Foreign Office Action", CN Application No. 201110317851.5, dated May 8, 2014, 10 Pages.
"Foreign Office Action", EP Application 12859972.7, dated May 26, 2015, 4 pages.
"Foreign Office Action", EP Application No. 11831134.9, dated May 9, 2014, 3 Pages.
"Foreign Office Action", EP Application No. 12859485.0, dated Feb. 12, 2015, 5 pages.
"Foreign Office Action", EP Application No. 12859600.4, dated Jun. 1, 2015, 8 Pages.
"Foreign Office Action", EP Application No. 12860373.5, dated Jul. 7, 2015, 6 pages.
"Foreign Office Action", EP Application No. 12860631.6, dated Feb. 16, 2015, 5 pages.
"Foreign Office Action", JP Application No. 2013-532806, dated Jun. 10, 2015, 11 pages.
"iCloud: What You Need to Know", MacWorld.com—retrieved from <http://www.macworld.com/article/160380/2011/06/icloud__what_you_need_to_know.html> on Dec. 13, 2011, Jun. 8, 2011, 16 pages.
"In Case of Emergency (ICE) and smart phone with lock screens", Ars Technica OpenForum—Retrieved at: http://arstechnica.com/civis/viewtopic.php?f=20&t=1140661, Mar. 29, 2011, 8 pages.
"International Search Report and Written Opinion", Application No. PCT/US2012/071559, dated Mar. 28, 2013, 10 pages.
"International Search Report and Written Opinion", Application No. PCT/US2012/071546, dated Apr. 29, 2013, 10 pages.
"International Search Report and Written Opinion", Application No. PCT/US2011/049614, dated Mar. 26, 2012, 7 pages.
"International Search Report and Written Opinion", Application No. PCT/US2009/039509, dated Nov. 18, 2009, 8 Pages.
"International Search Report and Written Opinion", Application No. PCT/US2012/071545, dated Mar. 28, 2013, 9 pages.
"International Search Report and Written Opinion", Application No. PCT/US2012/071557, dated Mar. 28, 2013, 9 pages.
"International Search Report and Written Opinion", Application No. PCT/US2012/071555, dated Apr. 25, 2013, 9 pages.
"iPad Parental Control (restricting app access)", iPad Reviews, Jailbreak Guides; last retrieved from http://ipaded.net/ipad/parental-control/ on Feb. 29, 2012, 5 pages.
"Mobile Phone Match-Up", Retrieved at: <http://www.microsoft.com/windowsmobile/enus/meet/version-compare.mspx>, Jul. 27, 2010, 4 pages.
"Mobile Task Tracker Screen Shots", Retrieved from <http://www.mobiletasktracker.com/Screen%20Shots.html>, Jul. 13, 2011, 4 Pages.
"Non Final Office Action", U.S. Appl. No. 13/222,538, dated Feb. 14, 2013, 33 Pages.
"Non-Final Office Action", U.S. Appl. No. 12/194,213, dated Mar. 17, 2011, 11 Pages.
"Non-Final Office Action", U.S. Appl. No. 12/897,586, dated May 8, 2014, 12 pages.
"Non-Final Office Action", U.S. Appl. No. 12/897,586, dated Oct. 18, 2012, 12 pages.
"Non-Final Office Action", U.S. Appl. No. 13/222,538, dated Oct. 11, 2013, 38 pages.
"Non-Final Office Action", U.S. Appl. No. 13/328,312, dated Aug. 6, 2013, 18 pages.
"Non-Final Office Action", U.S. Appl. No. 13/726,027, dated Jun. 24, 2014, 17 pages.
"Non-Final Office Action", U.S. Appl. No. 13/726,040, dated Jan. 28, 2015, 14 pages.
"Non-Final Office Action", U.S. Appl. No. 13/726,043, dated Sep. 11, 2014, 14 pages.
"Non-Final Office Action", U.S. Appl. No. 13/726,043, dated Oct. 8, 2015, 20 pages.
"Non-Final Office Action", U.S. Appl. No. 13/726,048, dated Dec. 9, 2014, 12 pages.
"Non-Final Office Action", U.S. Appl. No. 13/726,049, dated Jul. 7, 2015, 14 pages.
"Non-Final Office Action", U.S. Appl. No. 13/726,049, dated Dec. 4, 2014, 9 pages.
"Non-Final Office Action", U.S. Appl. No. 13/726,090, dated Jun. 23, 2015, 31 pages.
"Non-Final Office Action", U.S. Appl. No. 13/726,090, dated Jun. 24, 2014, 28 pages.
"Non-Final Office Action", U.S. Appl. No. 13/726,092, dated Feb. 12, 2015, 21 pages.
"Non-Final Office Action", U.S. Appl. No. 13/726,099, dated Jan. 7, 2015, 10 pages.
"Non-Final Office Action", U.S. Appl. No. 13/726,099, dated Mar. 18, 2014, 8 pages.
"Non-Final Office Action", U.S. Appl. No. 13/875,139, dated Oct. 3, 2013, 12 pages.
"Non-Final Office Action", U.S. Appl. No. 13/875,139, dated Oct. 24, 2014, 15 Pages.
"Non-Final Office Action", U.S. Appl. No. 14/495,418, dated Jul. 2, 2015, 18 pages.
"Non-Final Office Action", U.S. Appl. No. 14/686,300, dated Jun. 8, 2015, 11 pages.
"Notice of Allowance", U.S. Appl. No. 12/194,213, dated May 31, 2013, 11 Pages.
"Notice of Allowance", U.S. Appl. No. 12/194,213, dated Jun. 27, 2012, 16 Pages.
"Notice of Allowance", U.S. Appl. No. 12/194,213, dated Dec. 21, 2012, 13 Pages.
"Notice of Allowance", U.S. Appl. No. 12/897,586, dated Jan. 5, 2015, 7 Pages.
"Notice of Allowance", U.S. Appl. No. 12/897,586, dated Oct. 15, 2014, 13 Pages.
"Notice of Allowance", U.S. Appl. No. 13/726,043, dated May 4, 2016, 15 pages.
"Notice of Allowance", U.S. Appl. No. 13/726,097, dated Jun. 10, 2014, 7 pages.

(56) References Cited

OTHER PUBLICATIONS

"Notice of Allowance", U.S. Appl. No. 13/875,139, dated Mar. 5, 2015, 7 pages.
"Parental Control Software for Cell Phones", retrieved from <http://www.parentalcontrolcellphones.com/> on Dec. 8, 2011, Apr. 30, 2010, 5 pages.
"Restrict Access to Applications using AppLocker", Retrieved from: <http://www.dq.winsila.com/tips-tricks/restrict-access-to-applications-using-applocker.html> on Feb. 13, 2012, Jan. 5, 2012, 2 pages.
"Restriction Requirement", U.S. Appl. No. 13/726,048, dated Jun. 20, 2014, 5 pages.
"Restriction Requirement", U.S. Appl. No. 13/726,049, dated Jul. 1, 2014, 6 pages.
"Restriction Requirement", U.S. Appl. No. 13/726,097, dated Mar. 21, 2014, 7 pages.
"Safe Driving System", Retrieved from <http://web.archive.org/web/20100512220953/http://key2safedriving.com/>, May 12, 2010, 2 pages.
"Setting up and Using Smart Unlock on the Samsung Jet", Retrieved at: <http://www.knowyourmobile.com/samsung/samsungjet/samsungjetuserguides/317988/setting_up_and_using_smart_unlock_on_the_samsung_jet.html>, Jun. 20, 2010, 2 pages.
"Setting Up Simple Restricted Access", Retrieved at: http://support.webvanta.com/support_article/615777-setting-up-simple-restricted-access—on Feb. 29, 2012, 3 Pages.
"Supplemental Notice of Allowance", U.S. Appl. No. 12/897,586, dated Mar. 3, 2015, 2 Pages.
"Supplementary European Search Report", EP Application No. 12859485.0, dated Jan. 23, 2015, 4 pages.
"Supplementary European Search Report", EP Application No. 12859972.7, dated Apr. 30, 2015, 3 pages.
"Supplementary European Search Report", EP Application No. 12860373.5, dated Jun. 25, 2015, 3 pages.
"Supplementary European Search Report", EP Application No. 12860631.6, dated Jan. 5, 2015, 3 pages.
"Supplementary Search Report", EP Application No. 11831134.9, dated Apr. 3, 2014, 3 pages.
"T-Mobile G1 Google Android Phone—Gesture Unlocking", Retrieved at: <http://www.gadgetuniversegift.com/?p=2121>, Jun. 20, 2010, 2 pages.
"T-Mobile G1 User Manual", pp. 102-103, May 27, 2009, 5 pages.
"Welcome to Sprint Drive First", Retrieved at <<https://drivefirst.sprint.com/welcome.htm>> on Nov. 20, 2013, 2013, 2 pages.
"Your Very Own Support Geek", retrieved from <http://yoursupportgeek.info/miscellaneous-geek-stuff/t-mobile-uk-to-offer-icd-vega-15-inch-tegra-android-tablet-in-2010> on Dec. 13, 2011, Jan. 7, 2010, 2 pages.
Aventail,"Aventail and Trust Digital Launch Integrated Secure Mobile Access Solution", http://findarticles.com/p/articles/mi_pwwi/is_200602/ai_n16063742/?tag=content;col1, Last accessed May 14, 2008, Feb. 2006, 3 Pages.
Bhandari,"Full Touchscreen Samsung Star (S5233), Star 3G (S5603) and Beat DJ Launced in India", Retrieved at: http://www.tecfre.com/full-touchscreen-samsung-star-s5233-star-3g-s5603-and-beat-dj-launched-in-india/, May 11, 2009, 12 pages.
Bilderbeek,"From Unified to Social Communications and Collaboration", retrieved from <http://www.themetisfiles.com/2011/10/from-unified-to-social-communications-and-collaboration/> on Dec. 13, 2011, Oct. 25, 2011, 4 pages.
Campbell,"Biometrically Enhanced Software-Defined Radios", Proc. Software Defined Radio Technical Conf, Orlando, Florida, Nov. 2003, 6 Pages.
Chen,"Here's the Google Phone Apple Wants You to Have", Retrieved at: http://www.wired.com/2010/03/apple-htc-google/, Mar. 5, 2010, 9 pages.
Ciprian,"Manage User Accounts", Retrieved at: http://www.vista4beginners.com/Manage-User-Accounts, May 8, 2007, 13 pages.
Covington,"Parameterized Authentication", Proc. 9th European Symposium on Research Computer Security, Lecture notes in Computer Science, Sep. 2004, 18 Pages.
Cui,"Facilitating Consumption of Online Social Networking Services on Mobile Devices", Proceedings of the 13th international conference on Ubiquitous Computing, Sep. 17, 2011, 4 Pages.
Davies,"T-Mobile UK to Offer ICD Vega 15-inch Tegra Android Tablet in 2010", Retrieved from <http://www.slashgear.com/t-mobile-uk-to-offer-icd-vega-15-inch-tegra-android-tablet-in-2010-0768671/> on Mar. 11, 2013, Jan. 7, 2010, 7 pages.
DiPane,"Sprint to Bring Parental Locks to Android Phones to Prevent Use While Driving", retrieved from <http://www.androidcentral.com/sprint-bring-parental-locks-android-phones-prevent-use-while-driving> on Dec. 8, 2011, Mar. 22, 2011, 7 pages.
Hoffmann,"Multilateral Security in Mobile Applications and Location Based Services", https://users.cs.jmu.edu/bernstdh/web/CS685/papers/hoffman-et-al-2002.pdf, Last accessed May 14, 2008, 2002, 18 Pages.
Jagadeesan,"A Novel Approach to Design of User Re-Authentication Systems", Proc. 3rd IEEE Intl. Conf. on Biometrics: Theory, Applications and Systems, Sep. 2009, 6 Pages.
Kharif,"Parental Controls for Mobile Phones? You Bet", Tech Beat, retrieved from <http://www.businessweek.com/the_thread/techbeat/archives/2005/08/parental_contro.html> on Dec. 8, 2011, Aug. 16, 2005, 12 pages.
King,"Mobile Device Child Share", U.S. Appl. No. 13/726,095, filed Mar. 21, 2013, 57 Pages.
Klosterman,"Secure Continuous Biometric-Enhanced Authentication", Technical Report, May 2000, May 2000, 25 Pages.
Kottahachchi,"Access Controls for Intelligent Environments", In: Proceedings of ISDA '04: 4th Annual International Conference on Intelligent Systems Design and Applications. Budapest, Hungary (2004), 2004, 6 Pages.
LeBlanc,"The Device Experience in Windows 7—Updated", Windows 7 Team Blog, retrieved from <http://windowsteamblog.com/windows/archive/b/windows7/archive/2009/09/01/the-device-experience-in-windows-7-updated.aspx> on Dec. 13, 2011, Sep. 1, 2009, 14 pages.
Liu,"xShare: Supporting Impromptu Sharing of Mobile Phones", In Proceedings of the 7th international conference on Mobile systems, applications, and services, Jun. 22, 2009, pp. 15-28.
Moran,"Getting Started with Windows 7", 2009, 412 pages.
Mui,"The Lifesaving Smartphone Feature That We Need: Driving Mode", Retrieved from <http://www.forbes.com/sites/chunkamui/2011/12/19/the-smart-phone-feature-that-we-need-driving-mode/>, Dec. 19, 2011, 4 pages.
Nasar,"Mobile Telephones, Distracted Attention, and Pedestrian Safety", Accident Analysis & Prevention, retrieved from <http://facweb.knowlton.ohiostate.edu/jnasar/crpinfo/research/MobilePhones_AAP_2007.pdf> on Dec. 8, 2011, Jan. 2008, pp. 69-75.
Niino,"There was free enterprise microblogging, Japanese were developed "youRoom!" Free plan upgrade just mutter", Retrieved from <http://www.publickey1.jp/blog/10/youroom.html>, Dec. 21, 2010, 4 Pages.
Patten,"Using Mobile Telephones: Cognitive Workload and Attention Resource Allocation", Accident Analysis and Prevention, retrieved from <http://beta.nsc.org/safety_road/Distracted_Driving/Documents/Using%20mobile%20telephones,%20cognitive%20workload%20and%20attention%20resource%20allocation.pdf> on Dec. 8, 2011, May 2004, pp. 341-350.
Quick,"BizzTrust for Android splits a single smartphone into two virtual phones", http://www.gizmag.com/bizztrust-for-android/20114/, Retrieved on Jan. 10, 2012, Oct. 2011, 4 Pages.
Raja,"How to Replace and Customize Android Lock Screen [Guide]", Retrieved at: http://www.addictivetips.com/mobile/how-to-replace-and-customize-android-lock-screen-guide/, Jun. 10, 2011, 14 pages.
Saenz,"Unlock Your Door with Your Phone, Text a Key to a Friend—Lockitron is Awesome (video)", Retrieved from: <http://singularityhub.com/2011/05/24/unlock-your-door-with-your-phone-text-a-key-to-a-friend-lockitron-is-awesome-video/> on Feb. 10, 2012, May 24, 2011, 3 pages.

(56) References Cited

OTHER PUBLICATIONS

Samberg,"Stay Focused While Driving", Retrieved from <<http://www.verizonwireless.com/news/2012/09/safely-go-driving-app.html>> on Nov. 20, 2013, Sep. 13, 2012, 5 pages.
Simonite,"One Smart Phone, Two Personalities", http://www.technologyreview.com/communications/38865/, Retrieved Jan. 10, 2012, Oct. 13, 2011, 3 Pages.
Stajano,"One user, many hats; and, sometimes, no hat?towards a secure yet usable pda", Security Protocols Workshop, Springer Verlag, 2004, 14 Pages.
Temporale,"Removing Application Lock on Windows Mobile Standard Devices", http://www.mobilejaw.com/articles/2009/09/removing-application-lock-on-windows-mobile-standard-devices/, Retrieved on Oct. 13, 2011, Sep. 4, 2009, 10 Pages.
Tiemann,"AT&T Adds Parental Control Options to Cell Phones", CNET News—retrieved from <http://news.cnet.com/8301-13507_3-9770506-18.html> on Dec. 8, 2011, Sep. 7, 2007, 1 pages.
Warren,"Microsoft Flaunts Metro Style PowerPoint Live Tiles", WinRumors—retrieved from <http://www.winrumors.com/microsoft-flaunts-metro-style-powerpoint-live-tiles-video/> on Dec. 13, 2011, Jul. 11, 2011, 12 pages.
Weilenmann,"Local Use and Sharing of Mobile Phones", In B. Brown, N. Green & R. Harper (Eds.) Wireless World: Social and Interactional Aspects of the Mobile Age. Godalming and Hiedleburg: Springer Verlag, 2001, pp. 99-115.
Williams,"AT&T Drive Mode, The Anti-Texting While Driving Mobile Solution (video)", Retrieved from <http://www.talkandroid.com/66579-att-drive-mode-the-anti-texting-while-driving-mobile-solution-video/>, Oct. 13, 2011, 6 pages.
Wood,"Hey, Phone Makers: Where's 'Driving Mode'?", Retrieved from <http://news.cnet.com/8301-31322_3-20003824-256.html>, Apr. 29, 2010, 3 pages.
Zaplata,"Context-based Cooperation in Mobile Business Environments—Managing the Distributed Execution of Mobile Processes", Business & Information Systems Engineering, Apr. 2009, pp. 301-314.
"Advisory Action", U.S. Appl. No. 13/919,479, dated Dec. 31, 2015, 3 pages.
"Final Office Action", U.S. Appl. No. 13/919,479, dated Aug. 13, 2015, 18 pages.
"Finally, A Location-Sharing App That's Less Creepy Than Foursquare", Retrieved at: http://www.fastcodesign.com/1670275/finally-a-location-sharing-app-thats-less-creepy-than-foursquare, Jul. 11, 2012, 8 pages.
"Find My Friends app goes live ahead of iOS 5 release", Retrieved at: http://9to5mac.com/2011/10/12/find-my-friends-app-goes-live-ahead-of-ios-5-release/, Oct. 12, 2011, 10 pages.
"Non-Final Office Action", U.S. Appl. No. 13/919,479, dated Jan. 2, 2015, 13 pages.
"Non-Final Office Action", U.S. Appl. No. 13/919,479, dated Feb. 3, 2015, 15 pages.
"Non-Final Office Action", U.S. Appl. No. 13/919,479, dated May 3, 2016, 8 pages.
Brian,"Space-time for iOS: The simple app that lets you request a person's location regardless of their smartphone", Retrieved at: http://thenextweb.com/apple/2012/04/20/spacetime-for-ios-the-simple-app-that-lets-you-request-a-persons-location-regardless-of-their-smartphone/#gref, Apr. 20, 2012, 7 pages.
Nagpal,"We're in, Location Sharing App from Microsoft Released for WP7", Available at: http://www.igyaan.in/15078/in-location-sharing-app-microsoft-released-wp7/, Aug. 19, 2011, 13 pages.
Webster,"Location sharing app Glympse gets major update", Retrieved at: http://www.androidguys.com/2012/10/16/location-sharing-app-glympse-gets-major- update/, Oct. 16, 2012, 5 pages.
"Non-Final Office Action", U.S. Appl. No. 13/409,905, dated Jan. 12, 2016, 21 pages.
"Foreign Office Action", CN Application No. 201210592889.8, dated Dec. 3, 2015, 6 pages.
Miller,"Geographic Data Mining and Knowledge Discovery", Handbook of Geographic Information Science, Taylor & Francis, Inc., 2009, 20 pages.
Qian,"Profiling Resource Usage for Mobile Applications: A Cross-layer Approach", in MobiSys'11, 2011, 14 pages.
Satyanarayanan,"Pervasive Computing: Vision and Challenges", In IEEE Personal Communications, 2001, Aug. 2001, 10 pages.
Shepard,"LiveLab: Measuring Wireless Networks and Smartphone Users in the Field", SIGMETRICS Performance Evaluation Review, vol. 38, Issue 3, Jan. 3, 2011, 5 pages.
Wray,"Daily Tip: How to make your iPhone camera launch instantly [Jailbreak]", Retrieved from: http://www.imore.com/daily-tip-iphone-camera-launch-instantly-jailbreak, Apr. 20, 2011, 11 pages.
Zhu,"Efficient Elastic Burst Detection in Data Streams", In KDD '03, Proceedings of the Ninth ACM SIGKDD International Conference on Knowledge Discovery and Data Mining,, Aug. 24, 2003, 10 pages.
"Extended European Search Report", EP Application No. 12883789.5, dated Apr. 22, 2016, 7 pages.
"Foreign Office Action", CN Application No. 201210592889.8, dated Mar. 11, 2016, 8 pages.
"Non-Final Office Action", U.S. Appl. No. 13/918,810, dated Apr. 20, 2016, 28 pages.
"Non-Final Office Action", U.S. Appl. No. 13/918,818, dated May 5, 2016, 25 pages.
"Final Office Action", U.S. Appl. No. 13/918,818, dated Apr. 6, 2017, 6 pages.
"Non-Final Office Action", U.S. Appl. No. 15/216,552, dated Mar. 29, 2017, 19 pages.
"Notice of Allowance", U.S. Appl. No. 13/726,043, dated Mar. 17, 2017, 15 pages.
"Notice of Allowance", U.S. Appl. No. 13/726,043, dated May 19, 2017, 8 pages.
"Notice of Allowance", U.S. Appl. No. 15/143,731, dated Apr. 27, 2017, 7 pages.
"Advisory Action", U.S. Appl. No. 13/919,479, dated May 31, 2017, 6 pages.
"Foreign Office Action", RU Application No. 2015153200, dated Apr. 25, 2017, 8 pages.
"Notice of Allowance", U.S. Appl. No. 13/918,818, dated Jun. 19, 2017, 8 pages.
"Android Developers Reference: Locationmanager", Retrieved at: <<http://developer.android.com/>>—on Jun. 27, 2009, 1 page.
"Bluecasting—Wikipedia", Retrieved from the Internet on Oct. 2, 2008 at <<http://en.wikipedia.org/wiki/Bluecasting, 1 pages.
"Bluetooth Specification", Retrieved at: <<http://bluetooth.com/>>—on Oct. 19, 2008, 1 page.
"Corrected Notice of Allowance", U.S. Appl. No. 14/495,418, dated Feb. 25, 2016, 2 pages.
"Corrected Notice of Allowance", U.S. Appl. No. 14/495,418, dated Feb. 29, 2016, 2 pages.
"Ex Parte Quayle Action", U.S. Appl. No. 13/551,613, dated Mar. 9, 2016, 4 pages.
"Final Office Action", U.S. Appl. No. 13/222,538, dated Jan. 27, 2014, 39 pages.
"Final Office Action", U.S. Appl. No. 13/551,613, dated Mar. 11, 2015, 14 pages.
"Final Office Action", U.S. Appl. No. 13/726,031, dated Mar. 24, 2016, 20 pages.
"Final Office Action", U.S. Appl. No. 13/726,031, dated Apr. 13, 2015, 14 pages.
"Final Office Action", U.S. Appl. No. 13/726,048, dated Aug. 5, 2015, 13 pages.
"Final Office Action", U.S. Appl. No. 13/726,049, dated Feb. 1, 2016, 15 pages.
"Final Office Action", U.S. Appl. No. 13/726,090, dated Dec. 15, 2015, 34 pages.
"Final Office Action", U.S. Appl. No. 13/918,810, dated Oct. 18, 2016, 25 pages.
"Final Office Action", U.S. Appl. No. 13/919,479, dated Jan. 6, 2017, 16 pages.
"Final Office Action", U.S. Appl. No. 14/686,300, dated Apr. 8, 2016, 16 pages.

(56) References Cited

OTHER PUBLICATIONS

"Foreign Notice of Allowance", CN Application No. 201110317851.5, dated Dec. 2, 2015, 4 pages.
"Foreign Notice of Allowance", CN Application No. 201210592889.8, dated Aug. 18, 2016, 4 pages.
"Foreign Notice of Allowance", JP Application No. 2015-529778, dated Nov. 22, 2016, 4 pages.
"Foreign Office Action", CN Application No. 20128004066.6, dated Sep. 29, 2016, 6 pages.
"Foreign Office Action", CN Application No. 201380038072.9, dated Aug. 25, 2016, 9 pages.
"Foreign Office Action", CN Application No. 201380038072.9, dated Dec. 31, 2015, 14 pages.
"Foreign Office Action", EP Application No. 12860403.0, dated May 20, 2015, 4 pages.
"Foreign Office Action", EP Application No. 12860631.6, dated Apr. 21, 2016, 5 pages.
"Foreign Office Action", JP Application No. 2014-550338, dated Nov. 22, 2016, 5 pages.
"Foreign Office Action", TW Application No. 102127829, dated Nov. 16, 2016, 10 pages.
"How to Set Up an ICE Contact on Your iPhone", Retrieved at: https://rnn10.wordpress.com/2010/06/21/how-to-set-up-an-ice-contact-on-your-iphone/, Jun. 21, 2010, 14 pages.
"International Preliminary Report on Patentability", Application No. PCT/US2013/050963, dated Jan. 29, 2015, 11 pages.
"International Preliminary Report on Patentability", Application No. PCT/US2011/049614, dated Apr. 18, 2013, 5 pages.
"International Preliminary Report on Patentability", Application No. PCT/US2012/071562, dated Mar. 12, 2015, 6 pages.
"International Preliminary Report on Patentability", Application No. PCT/US2012/071544, dated Jul. 3, 2014, 6 pages.
"International Preliminary Report on Patentability", Application No. PCT/US2012/071545, dated Jul. 3, 2014, 6 pages.
"International Preliminary Report on Patentability", Application No. PCT/US2009/039509, dated Nov. 25, 2010, 6 pages.
"International Preliminary Report on Patentability", Application No. PCT/US2012/071559, dated Jul. 3, 2014, 7 pages.
"International Search Report and Written Opinion", Application No. PCT/US2012/071544, dated Feb. 27, 2013, 9 pages.
"iOS 5", Retrieved from <https://en.wikipedia.org/wiki/IOS_5, Oct. 12, 2011, 6 pages.
"Kids Place—Parental Control", Retrieved at <<http://www.amazon.com/Kiddoware-Kids-Place-Parental-Control/dp/B0061S073A>>—on May 29, 2013, Oct. 31, 2011, 5 pages.
"Location-Based Social Networking Marketing White Paper", The Marketer's Guide to Location-Based Social Networks, Anvil Media, Inc., 2010, 14 pages.
"Non-Final Office Action", U.S. Appl. No. 13/551,613, dated Jul. 16, 2015, 10 pages.
"Non-Final Office Action", U.S. Appl. No. 13/551,613, dated Aug. 13, 2014, 9 pages.
"Non-Final Office Action", U.S. Appl. No. 13/726,031, dated Jul. 8, 2014, 13 pages.
"Non-Final Office Action", U.S. Appl. No. 13/726,031, dated Aug. 27, 2015, 17 pages.
"Non-Final Office Action", U.S. Appl. No. 13/726,048, dated Nov. 20, 2015, 14 pages.
"Non-Final Office Action", U.S. Appl. No. 13/726,090, dated Jun. 3, 2016, 21 pages.
"Non-Final Office Action", U.S. Appl. No. 13/726,099, dated Jun. 23, 2016, 14 pages.
"Non-Final Office Action", U.S. Appl. No. 13/918,818, dated Dec. 19, 2016, 7 pages.
"Non-Final Office Action", U.S. Appl. No. 14/686,300, dated Nov. 30, 2015, 12 pages.
"Non-Final Office Action", U.S. Appl. No. 14/746,763, dated Jun. 30, 2016, 6 pages.
"Non-Final Office Action", U.S. Appl. No. 14/746,763, dated Nov. 6, 2015, 11 pages.
"Non-Final Office Action", U.S. Appl. No. 15/143,731, dated Jul. 27, 2016, 18 pages.
"Notice of Allowance", U.S. Appl. No. 13/222,538, dated May 13, 2014, 11 pages.
"Notice of Allowance", U.S. Appl. No. 13/328,312, dated Jan. 2, 2014, 9 pages.
"Notice of Allowance", U.S. Appl. No. 13/551,613, dated Jun. 6, 2016, 5 pages.
"Notice of Allowance", U.S. Appl. No. 13/726,043, dated Aug. 16, 2016, 8 pages.
"Notice of Allowance", U.S. Appl. No. 13/726,048, dated Mar. 28, 2016, 8 pages.
"Notice of Allowance", U.S. Appl. No. 13/726,049, dated Jun. 9, 2016, 8 pages.
"Notice of Allowance", U.S. Appl. No. 13/726,049, dated Jul. 18, 2016, 8 pages.
"Notice of Allowance", U.S. Appl. No. 14/495,418, dated Feb. 5, 2016, 7 pages.
"Notice of Allowance", U.S. Appl. No. 14/495,418, dated Jul. 11, 2016, 7 pages.
"Notice of Allowance", U.S. Appl. No. 14/495,418, dated Oct. 7, 2015, 7 pages.
"Restriction Requirement", U.S. Appl. No. 13/551,613, dated Mar. 21, 2014, 8 pages.
"Summons to Attend Oral Proceedings", EP Application No. 12859485.0, dated May 4, 2016, 8 pages.
"Supplemental Notice of Allowance", U.S. Appl. No. 14/495,418, dated Aug. 12, 2016, 2 pages.
"Supplementary European Search Report", EP Application No. 12860403.0, dated May 4, 2015, 3 pages.
"XP User Starting to Use Windows 7", http://download.Microsoft.com/download/A/0/D/A0D4CF2B-9B70-4846-A18D-0765D1F75343/XPUsertoWindows7.pdf, Jun. 13, 2010, 9 pages.
Amin,"Fancy a Drink in Canary Wharf?: A User Study on Location-Based Mobile Search", Proceedings of the 12th IFIP TC 13 International Conference on Human-Computer Interaction: Part 1, Aug. 24, 2009, 14 pages.
Ashbrook,"Using GPS to Learn Significant Locations and Predict Movement Across Multiple Users", Personal and Ubiquitous Computing, vol. 7, No. 5, Oct. 2003, 15 pages.
Cramer,"Performing a Check-in: Emerging Practices, Norms and 'Conflicts' in Location-Sharing Using Foursquare", MOBILECHII 2011, ACM, 2011, 10 pages.
Dissanayake,"A Solution to the Simultaneous Localization and Map Building (SLAM) Problem", Proceedings of IEEE Transactions on Robotics and Automation, vol. 17, No. 3, Jun. 2001, 14 pages.
Farrell,"Energy-Efficient Monitoring of Mobile Objects with Uncertainty-Aware Tolerances", Proceedings of the 11th International Database Engineering and Applications Symposium, IDEAS 2007, Sep. 2007, 12 pages.
Galloway,"Android Parental Control Contains Kid Access to Your Smartphone", Retrieved at <<http://lifehacker.com/5835066/android-parental-control-contains-kid-access-to-your-smartphone>> on May 29, 2013, Aug. 27, 2011, 3 pages.
Gupta,"Adding GPS-Control to Traditional Thermostats: An Exploration of Potential Energy Savings and Design Challenges", Proceedings of the 7th International Conference on Pervasive Computing, May 2009, 18 pages.
Horvitz,"Predestination", U.S. Appl. No. 60/721,879, filed Sep. 29, 2005, 31 pages.
Kamvar,"Deciphering Trends in Mobile Search", IEEE Computer Society, Aug. 2007, 5 pages.
Karlson,"Owner Privacy in a Shared Mobile Device", U.S. Appl. No. 61/052,455, filed May 12, 2008, 27 pages.
Karlson,"Usage Profiles for the Mobile Phone", Workshop on Security and Privacy Issues in Mobile Phone Use, May 2008, 3 pages.
Kjaergaard,"Entracked: Energy-Efficient Robust Position Tracking for Mobile Devices", Proceedings of the 7th International Conference on Mobile Systems, Applications, and Services, Jun. 2009, 14 pages.

(56) References Cited

OTHER PUBLICATIONS

Kupper,"Efficient Proximity and Separation Detecting among Mobile Targets for Supporting Location-based Community Services", Mobile Computing and Communications Review, vol. 10, No. 3, Jul. 2006, 12 pages.

Lin,"Energy-Accuracy Aware Localization for Mobile Devices", In Proceedings of MobiSys 2010, Available at <http://research.microsoft.com/apps/pubs/default.aspx?id=120831>, Jun. 2010, pp. 1-14.

Liu,"Location Awareness Through Trajectory Prediction", Computers, Environment and Urban Systems 30.6, Jan. 2006, 16 pages.

Matthews,"Mobile Device Check-In", U.S. Appl. No. 61/580,119, filed Dec. 23, 2011, 19 pages.

Morton,"6 Geolocation Apps You May Not Have Heard About", retrieved from <http://www.r2integrated.com/blog/index.php/6-geolocation-apps-you-may-not-have-heard-of/> on Dec. 9, 2011, Mar. 27, 2011, 4 pages.

Priyantha,"Demo Abstract: Enabling Energy Efficient Continuous Sensing on Mobile Phones with LittleRock", Proceedings of the 9th ACM/IEEE International Conference on Information Processing in Sensor Networks, Apr. 2010, 2 pages.

Sadeh,"Understanding and Capturing People's Privacy Policies in a People Finder Application", Personal and Ubiquitous Computing vol. 13 Issue 6, Aug. 2009, retrieved from <http://www.casos.cs.cmu.edu/publications/papers/2009UnderstandingCapturingPeoples.pdf> on Dec. 9, 2011, Aug. 2009, 13 pages.

Sharkey,"Coding for Life-Battery Life, That Is", Google IO Developer Conference, May 7, 2009, 32 pages.

Steenson,"Beyond the Personal and Private: Modes of Mobile Phone Sharing in Urban India", Mobile Communication Research Annual, vol. 1 Transition Books, Jun. 2009, 20 pages.

Thiagarajan,"VTrack: Accurate, Energy-aware Road Traffic Delay Estimation Using Mobile Phones", Nov. 2009, 14 pages.

Wei,"PATS: A Framework of Pattern-Aware Trajectory Search", IEEE Eleventh International Conference on Mobile Data Management, May 23, 2010, 6 pages.

\* cited by examiner

ENERGY EFFICIENT LOCATION DETECTION

BACKGROUND

As technology has advanced, so too have the capabilities provided by smartphones and other portable computing devices. One such advancement is the increase in location awareness based programs of the devices, which can result in various functionality being provided based on where the devices are located. Although providing such functionality can be beneficial to users, it is not without its problems. One such problem is that determining the location of the device can consume a significant amount of energy, resulting in reduced battery life for the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a device one or more low energy sensors are used to determine a mobility state of the device. A determination is made, based on both the mobility state of the device and one or more places of interest for the device, of when to use a high energy sensor to determine a location of the device.

BRIEF DESCRIPTION OF THE DRAWINGS

The same numbers are used throughout the drawings to reference like features.

DETAILED DESCRIPTION

Energy efficient location detection is discussed herein. Various places of interest for a user of a device are defined, such as the user's home, workplace, frequently visited restaurants or businesses, and so forth. One or more low energy sensors are used to determine a mobility state for the device. The mobility state can indicate, for example, whether the device is stationary, moving with a person walking, or in a moving vehicle. Based on the mobility state for the device and the various places of interest to the user, a determination can be made as to when to use a high energy sensor to obtain a more accurate indication of the location of the user. For example, the high energy sensor may not be used until the device is close to a perimeter or edge of a place of interest for the device.

Figure 1:
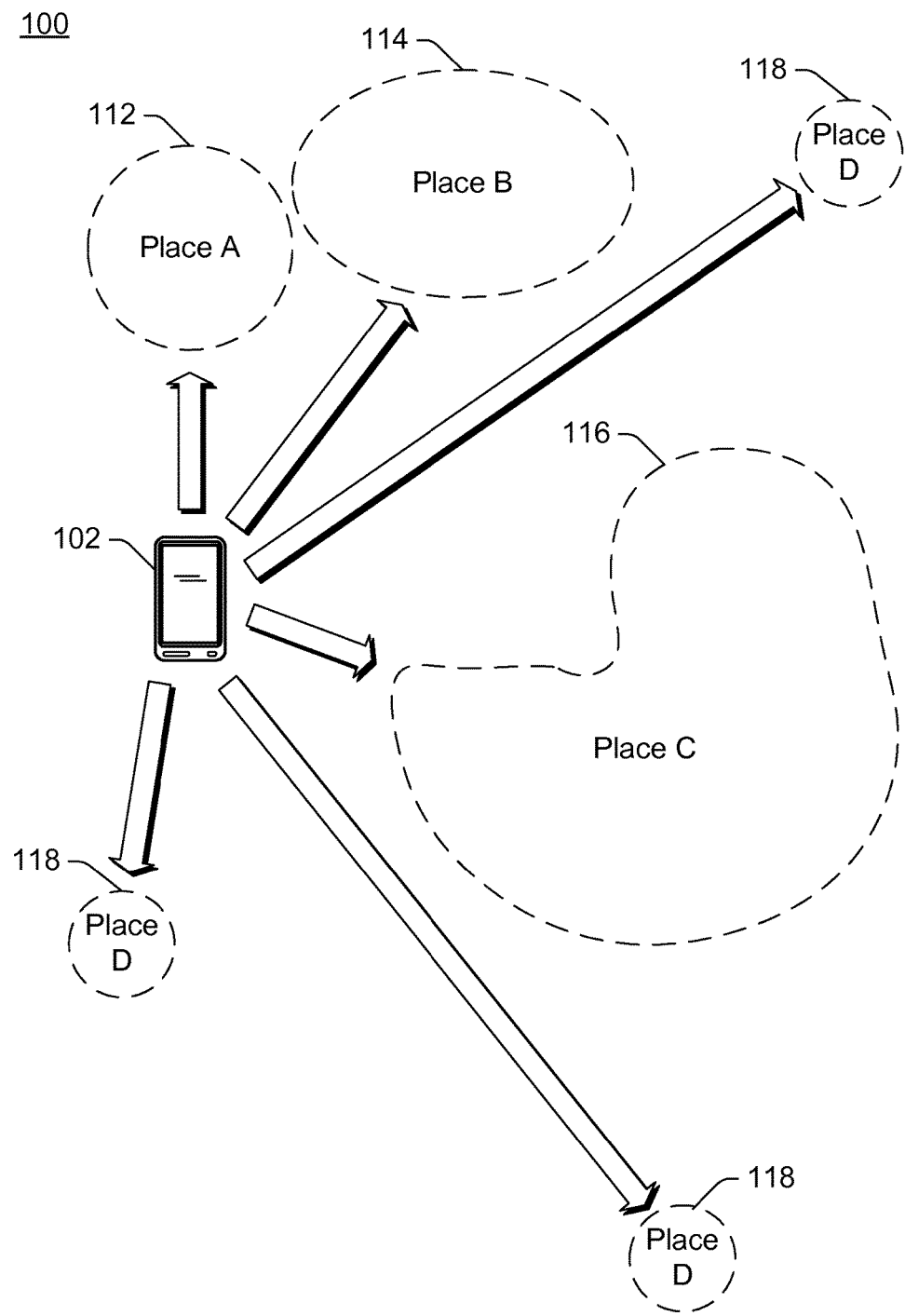
FIG. 1 illustrates an example system in which the energy efficient location detection discussed herein can be used.

FIG. 1 illustrates an example system 100 in which the energy efficient location detection discussed herein can be used. System 100 includes a computing device 102, which can be any of a variety of types of mobile devices. For example, computing device 102 can be a smartphone or other wireless phone, a laptop or netbook computer, a tablet or notepad computer, a mobile station, an entertainment appliance, an audio and/or video playback device, a game console, an automotive computer, and so forth. Computing device 102 is typically referred to as being a mobile device because device 102 is designed or intended to be moved to multiple different locations (e.g., taken by a user with him or her as the user goes to different locations).

System 100 illustrates multiple places of interest 112, 114, 116, and 118. These places of interest are also referred to as simply places. Each place 112-118 is a place or context of interest for device 102 (e.g., a place or context of interest to a user of device 102). For example, places 112-118 can be the user's home, the user's workplace, restaurants or businesses visited by the user, educational facilities, public services (e.g., libraries), geographic places (e.g., cities or states), and so forth, Different users of device 102 can optionally have different places of interest. Device 102 is mobile and can be moved into and out of places 112-118. At any given time, device 102 can be within one of places 112-118, or within no place. Situations can also arise in which two or more places 112-118 overlap, in which case a device 102 can be within two or more places 112-118 at one time. It should be noted that the illustration of FIG. 1 is not to scale, and that places 112-118 can be, and typically are, significantly larger in size than device 102. Although a single device 102 is illustrated in FIG. 1, it should be noted that different devices can be used in system 100, and that different devices can have the same and/or different places of interest.

Each place 112-118 has one or more attributes that define the place, and different places 112-118 can be defined by different attributes. One or more of various different attributes can be used to define a place of interest. An attribute defines a specific characteristic of a place, such as a geographic location, signals or devices that are detected when at that location, and so forth. For example, an attribute can be a specific geographic location, such as a street address, latitude and longitude coordinates (e.g., obtained from a global positioning system (GPS)), and so forth. By way of another example, an attribute can be an indication of signals and/or other devices that can be detected by device 102, such as signals received from one or more particular wireless access points (e.g., identified by particular media access control (MAC) addresses), signals received from one or more particular wireless networks (e.g., identified by particular service set identifiers (SSIDs) or other names), signals received from one or more particular cellular towers or transmitters (e.g., having particular tower or transmitter identifiers), signals received from one or more particular radio frequency identification (RFID) transmitters (including proximity transmitters, vicinity transmitters, etc.), and so forth.

Places of interest can be defined in different manners based on individual ones, or combinations, of these attributes. For example, a particular place can be defined as any location where a signal from a particular wireless access point (or from any one or more of multiple particular wireless access points) is detected and/or a signal received from a particular cellular transmitter is detected. By way of another example, a particular place can be defined as any location where a signal from a particular wireless network (e.g., having a particular SSID) is detected. By way of yet another example, a particular place can be defined as any location within a threshold distance (e.g., a particular number of feet, miles, etc.) of a particular latitude and longitude coordinate.

It should be noted that a particular place of interest can be, but need not be, made up of physically adjacent geographic locations. For example, place 116 can be a user's home that is defined as any location where a signal from a particular wireless access point and/or a signal from a particular cellular transmitter is detected. The locations where these signals are detected would typically be physically adjacent geographic locations. By way of another example, place 118 can be a particular business that is defined as any location where a signal from a particular wireless network (e.g., having a particular SSID) is detected. The business can have multiple locations (e.g., a chain of coffee shops) that are not physically adjacent geographic locations (e.g., can be in different parts of a city, can be in different cities or states, etc.). However, each of these multiple locations has a wireless network having an SSIDs that can be indicative of the business name, so all of these multiple locations are considered as part of the same place. For example, each of these multiple locations can have a wireless network having the same SSID, have a wireless network having an SSID beginning with the same characters (e.g., a business ABCD Company may have wireless networks at different locations with SSIDs of AB01, AB02, etc.), and so forth.

It should also be noted that the specific geographic location (e.g., street address, latitude and longitude) or locations where a place of interest is located can be known or alternatively unknown. For example, a place can be defined as any location where a signal from a particular wireless access point is detected even though the specific geographic location where that wireless access point is located is unknown (and optionally can change). Device 102 uses one or more places of interest 112-118 in performing the energy efficient location detection discussed herein as discussed below, and need not know the specific geographic locations of those places of interest.

The places of interest for device 102, and the attributes defining those places of interest, can be determined in one or more of a variety of different manners. Device 102 can be pre-configured with places of interest and the attributes that define those places of interest, can obtain places of interest and the attributes that define those places of interest from other services (e.g., Yellow pages or other directory services) or devices (e.g., by way of broadcasting, publishing, peer sharing, etc.), can receive inputs from a user of device 102 indicating places of interest and attributes that define those places of interests, combinations thereof, and so forth.

A user can define places of interest in a variety of different manners. For example, a user can input text or audible descriptions of places of interest and attributes that define those places of interests. By way of another example, a user can input, at any given time, an indication that device 102 is at a particular place of interest (e.g., the user selecting the place of interest from a menu or set of icons). In response to such an input, device 102 can identify one or more attributes and include those attributes as attributes defining the place of interest. For example, while device 102 is at the user's workplace, the user can input an indication to device 102 that device 102 is at the user's workplace. Device 102 can detect which wireless networks (e.g., having particular SSIDs) device 102 is receiving signals from, and add those wireless networks as an attribute defining the user's workplace place of interest.

Additionally, device 102 can determine an approximate area and/or perimeter (the edges) of places of interest in a variety of different manners. The perimeter of a place refers to the edge or boundary of the place, and the area of the place refers to the locations within that boundary (i.e., within the place of interest). Device 102 is within a particular place 112-118 if device 102 is physically located within the edge or boundary of that particular place 112-118. The perimeters of places 112-118 can be identified in different manners, such as a mapping of a geographic area that the place of interest encompasses. The perimeters of places 112-118 are illustrated with dashed lines in FIG. 1. The area and/or perimeter of a place of interest can be pre-configured in device 102, or obtained elsewhere such as from another device or service. Alternatively, the area and/or perimeter of a place of interest can be automatically determined by device 102. For example, if an attribute for a place is a signal being received from a particular cellular tower or transmitter, device 102 can track (using various low energy and/or high energy sensors as discussed below) where device 102 is moved and still receive the signal from that particular cellular tower or transmitter. Device 102 can use this tracking to effectively map a geographic area that the place of interest encompasses.

Device 102 includes one or more low energy sensors that are used to determine a mobility state for device 102, such as whether device 102 is stationary, is moving with a person walking, or is moving in a vehicle. Device 102 also has an estimate of its location relative to one or more places 112-118, which can be determined based on an indication from a high energy sensor and/or the one or more low energy sensors. Based on the mobility state for device 102, and the estimated location of device 102 relative to the edges of one or more places 112-118, device 102 determines when the high energy sensor is to be used to obtain a more accurate indication of the location of device 102.

Figure 2:
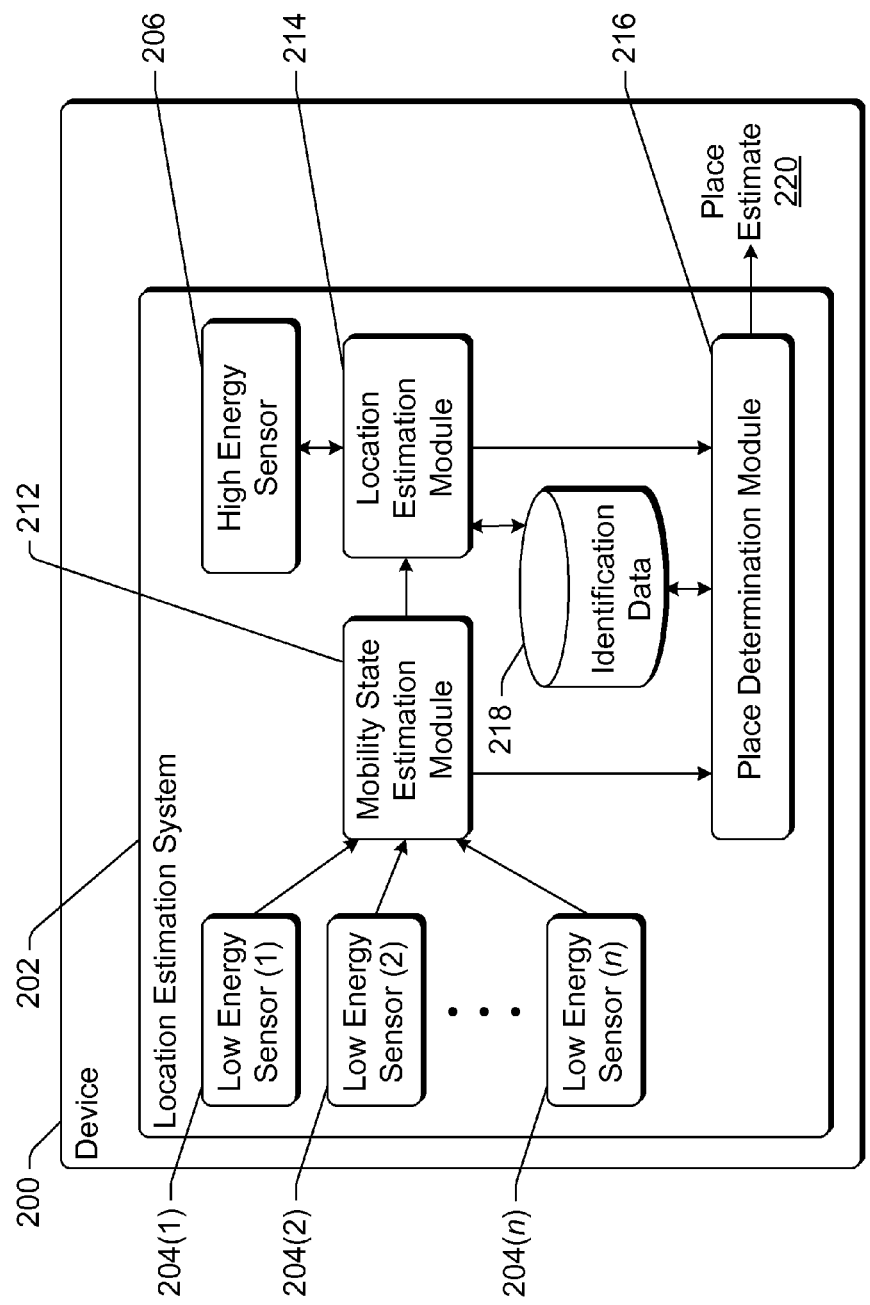
FIG. 2 is a block diagram illustrating an example device implementing the energy efficient location detection in accordance with one or more embodiments.

FIG. 2 is a block diagram illustrating an example device 200 implementing the energy efficient location detection in accordance with one or more embodiments. Device 200 can be, for example, a device 102 of FIG. 1. Device 200 includes a location estimation system 202 that uses data received from one or more (n) low energy sensors 204(1), . . . , 204(n) and a high energy sensor 206. Although a single high energy sensor is illustrated in device 200, it should be noted that location estimation system 202 can alternatively use multiple high energy sensors.

Location estimation system 200 also includes a mobility state estimation module 212, a location estimation module 214, a place determination module 216, and identification data 218. Identification data 218 includes data identifying various places of interest for device 200, including the attributes that define those places of interest as well as the area and/or perimeter of those places of interest. Mobility state estimation module 212 determines, based on data received from low energy sensors 204, a mobility state for device 200. Location estimation module 214 determines, based at least in part on the mobility state determined by module 212, when to activate high energy sensor 206. Place determination module 216 receives inputs from mobility state estimation module 212 and/or location estimation module 214, and determines based on those received inputs and optionally identification data 218, a place of interest (if any) that device 200 is within. Place determination module 216 provides an indication of this determined place of interest as place estimate 220.

In one more embodiments, data is obtained from low energy sensors 204 and/or high energy sensor 206 only after receiving user consent to do so. This user consent can be an opt-in consent, where the user takes an affirmative action to request that the data from low energy sensors 204 and/or high energy sensor 206 be obtained before any such data is obtained. Alternatively, this user consent can be an opt-out consent, where the user takes an affirmative action to request that the data from low energy sensors 204 and/or high energy sensor 206 not be obtained. If the user does not choose to opt out of obtaining this data, then it is an implied consent by the user to obtain this data. Furthermore, it should be noted that the data obtained from low energy sensors 204 and/or high energy sensor 206 can be maintained in device 200 and need not be communicated to other devices or services.

Figure 3:
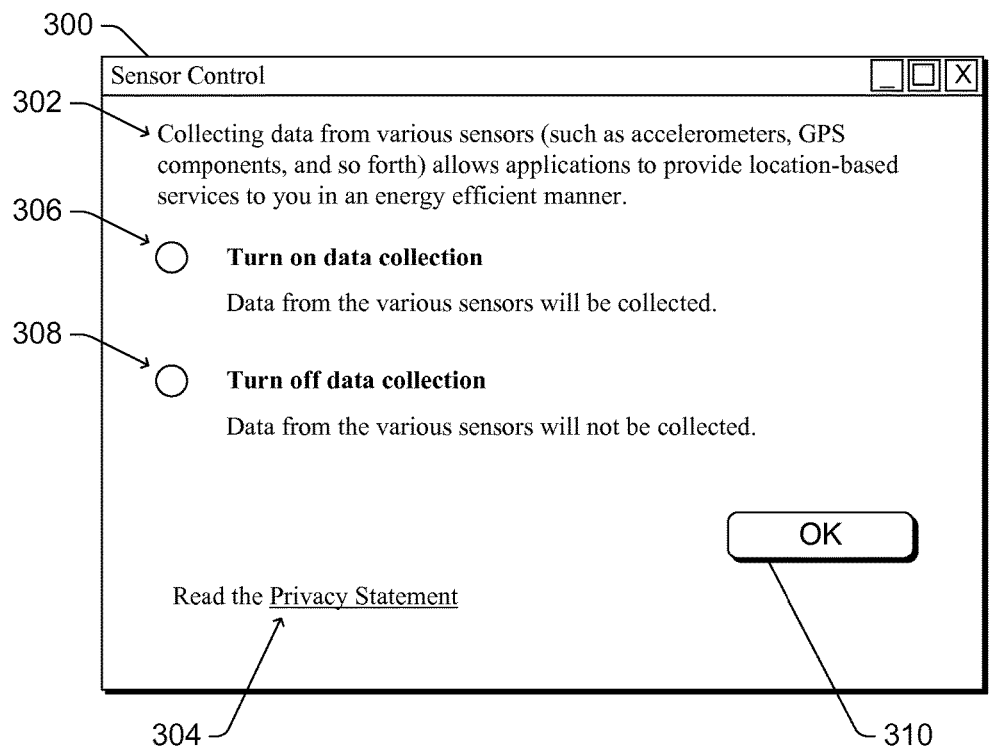
FIG. 3 illustrates an example user interface that can be displayed to a user to allow the user to select whether data from sensors is obtained in accordance with one or more embodiments.

FIG. 3 illustrates an example user interface that can be displayed to a user to allow the user to select whether data from low energy sensors 204 and/or high energy sensor 206 is obtained in accordance with one or more embodiments. A sensor control window 300 is displayed including a description 302 explaining to the user why the data is being obtained. A link 304 to a privacy statement is also displayed. If the user selects link 304, a privacy statement of location estimation service 202 of FIG. 2 is displayed, explaining to the user how the user's information is kept confidential.

Additionally, the user is able to select a radio button 306 to opt-in to the obtaining of data from low energy sensors 204 and/or high energy sensor 206, or a radio button 308 to opt-out of the obtaining of data from low energy sensors 204 and/or high energy sensor 206. Once a radio button 306 or 308 is selected, the user can select an "OK" button 310 to have the selection saved. It is to be appreciated that radio buttons and an "OK" button are only examples of user interfaces that can be presented to a user to opt-in or opt-out of the obtaining of the data from low energy sensors 204 and/or high energy sensor 206, and that a variety of other conventional user interface techniques can alternatively be used. Location estimation system 202 then proceeds to obtain data from the sensors and provide place estimation 220, or not obtain data from the sensors and not provide place estimation 220, in accordance with the user's selection.

Returning to FIG. 2, a low energy sensor 204 refers to a sensor that uses less than (or optionally equal to) a threshold amount of energy to provide data for use by location estimation system 202. This threshold amount can be a fixed value (e.g., a particular number of watts per hour), or a relative value (e.g., a largest amount of energy used by a particular number or particular percentage of the sensors 204 of device 200, such as the largest amount of energy used by the 40% of the sensors 204 that use the smallest amount of energy on device 200).

A high energy sensor 206 refers to a location sensor that uses greater than (or optionally equal to) a threshold amount of energy to provide data for use by location estimation system 202. This threshold amount can be a fixed value (e.g., a particular number of watts per hour), or a relative value (e.g., the amount of energy used by a particular type of sensor of device 200). This threshold amount can be the same threshold amount as used to refer to low energy sensors 204, or a different threshold amount. Alternatively, a high energy sensor 206 can refer to a particular type of sensor (e.g., a GPS component).

It should be noted that sensors being low energy or high energy refers to the energy used by the sensors to provide data for use by location estimation system 202 (e.g., modules 212, 214, and/or 216 within system 202). These sensors can also perform other operations in device 200 that use energy, but this other energy usage is not taken into account in determining whether the sensor is a low energy sensor or high energy sensor for location estimation system 202. Rather, the determination of whether the sensor is a low energy sensor or high energy sensor for location estimation system 202 is based on the amount of energy that the sensor uses to provide data for use by local estimation system 202. Thus, even if the overall energy usage by a particular sensor is greater than the threshold amount of energy, the sensor can still be a low energy sensor if the additional energy used by the sensor to provide data for use by location estimation system 202 is less than the threshold amount.

Each low energy sensor 204 can be one of a variety of different types of sensors. For example, a low energy sensor 204 can be an accelerometer, a compass, a proximity sensor (sensing how close device 200 is to the user of device 200), a gyroscope, a camera, a microphone, and so forth. A low energy sensor 204 can also be a wireless networking (e.g., WiFi) component that detects signals from wireless networks (e.g., identifiers of particular wireless access points, identifiers of particular wireless networks, etc.). A low energy sensor 204 can also be a cellular component that detects signals from cellular towers or transmitters.

Some types of sensors can be low energy sensors or high energy sensors at different times, depending on how the sensors are used. If a sensor is used in a manner resulting in the sensor using less than the threshold amount of energy to provide data for use by location estimation system 202 then the sensor is a low energy sensor, otherwise the sensor is a high energy sensor. For example, in some situations a WiFi component of device 200 may detect a wireless network, which uses less than the threshold amount of energy. In such situations, the WiFi component is a low energy sensor 204. However, in other situations the WiFi component may detect one or more wireless networks and communicate an indication of those one or more wireless networks to a remote service (e.g., via the Internet, via a cellular or other wireless network, etc.). The remote service maintains a record of where particular wireless networks are located, and based on the detected networks the remote service can determine the location of device 200. An indication of this location is returned to device 200. In such situations, where the WiFi component is transmitting and receiving data from a remote service, the WiFi component is a high energy sensor 206.

It should be noted that some types of sensors can be low energy sensors in some devices, and high energy sensors in other devices. For example, the hardware used to implement a WiFi component in some devices may result in the power used to turn on the WiFi component and detect a wireless network being greater than the threshold amount of energy, but the hardware used to implement a WiFi component in other devices may result in the power used to turn on the WiFi component and detect a wireless network being less than the threshold amount of energy.

It should also be noted that although low energy sensors 204 and high energy sensor 206 are illustrated as being part of device 200, one or more low energy sensors 204 and/or high energy sensor 206 can be implemented as a separate component or device that is coupled to device 200. For example, sensors can be implemented as part of a watch worn by a user, as part of a device attached to a user's shoe, as part of a heart rate monitor component, and so forth.

Mobility state estimation module 212 receives data from one or more low energy sensors 204 and determines, based on the received data, a mobility state for device 200. The mobility state for device 200 indicates at least whether device 200 is stationary or moving, and optionally also if device 200 is moving then a rate at which device 200 is moving. In one or more embodiments, the mobility state for device 200 indicates whether device 200 is stationary, is moving at a walking rate (e.g., a rate at which users would typically walk), or is moving at a vehicle rate (e.g., a rate at which users would typically be moving in a vehicle).

Figure 4:
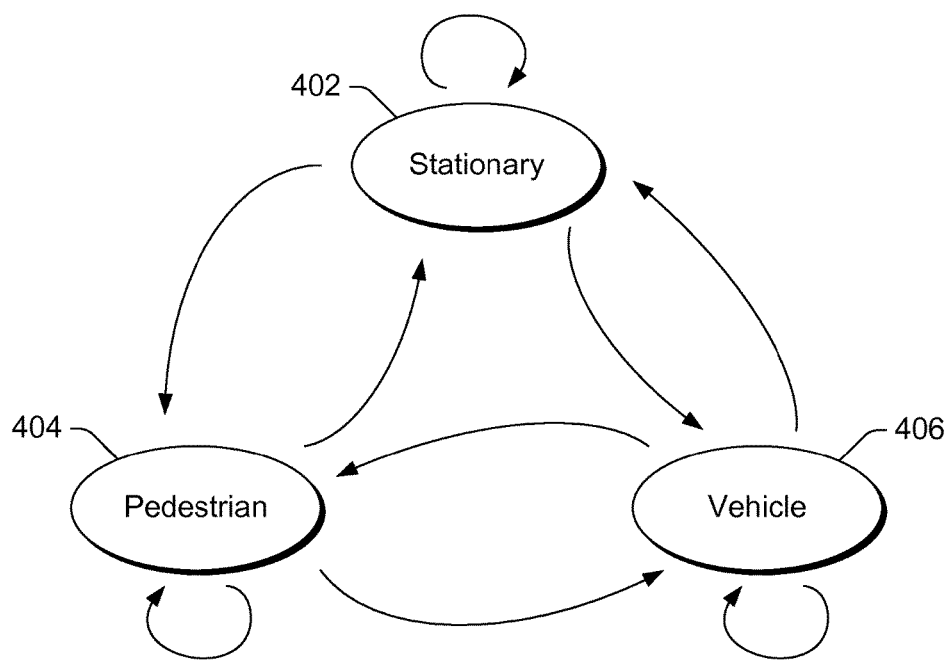
FIG. 4 illustrates an example state machine tracking the mobility state for a device in accordance with one or more embodiments.

FIG. 4 illustrates an example state machine 400 tracking the mobility state for a device in accordance with one or more embodiments. State machine 400 can be implemented by the mobility state estimation module, such as mobility state estimation module 212 of FIG. 2, to keep track of whether the device is stationary, moving at a walking rate, or moving at a vehicle rate.

State machine 400 includes a stationary state 402, a pedestrian state 404, and a vehicle state 406. Stationary state 402 indicates that the device is stationary, pedestrian state 404 indicates that the device is moving at a walking rate, and vehicle state 406 indicates that the device is moving at a vehicle rate. From any state 402-406, state machine 400 can stay at that same state or transition to any other state 402-406. Whether state machine 400 stays at the same state or transitions to another state is dependent on data received from one or more low energy sensors.

Although three states are illustrated in FIG. 4, it should be noted that state machine 400 can include any number of states and/or different states than are illustrated in FIG. 4. For example, rather than a pedestrian state 404, state machine 400 can include a walking state and a running state. By way of another example, rather than a vehicle state 406, state machine 400 can include an on-road vehicle state and an airplane state. By way of yet another example, rather than both pedestrian state 404 and vehicle state 406, state machine 400 can include just a moving state.

In one or more embodiments, the mobility state estimation module includes a profile for at least one low energy sensor (or combination thereof), the profile for a low energy sensor (or combination thereof) indicating what data provided by that low energy sensor indicates what state of state machine 400. The mobility state estimation module can be pre-configured with these profiles for one or more low energy sensors (or combination thereof), or can otherwise obtain the profiles (e.g., from one or more other devices or services). The profiles can be generated in a variety of different manners, such as based on observations of test users, automatically determined based on user feedback as to the mobility state at particular times, and so forth.

For example, a low energy sensor that is an accelerometer provides accelerometer data to the mobility state estimation module indicating the measured acceleration of the accelerometer. Larger values for the accelerometer data indicate greater acceleration of the accelerometer, and smaller values for the accelerometer data indicate lesser acceleration of the accelerometer. The variation in accelerometer data changes over time, and the profile indicates both a lower threshold value and an upper threshold value for the accelerometer data, the upper threshold value corresponding to a greater acceleration than the lower threshold value. The mobility state estimation module determines that if the accelerometer data is at or below the lower threshold value, then the device is in stationary state 402. However, if the accelerometer data is at or above the upper threshold value, then the device is in pedestrian state 404, and if the accelerometer data is between the upper and lower threshold values then the device is in vehicle state 406.

By way of another example, a cellular component that is a low energy sensor provides cellular tower data to the mobility state estimation module identifying a particular cellular tower that the device including the cellular component is in communication with. The mobility state estimation module determines a rate at which the cellular tower data changes, with larger rates of change indicating faster movement of the device and smaller rates of change indicating slower movement of the device. The rate at which the cellular tower data changes varies over time, and the profile indicates a threshold value for the rate of cellular tower data change. The mobility state estimation module determines that if the rate of cellular tower data is zero (indicating no cellular tower data change), then the device is in stationary state 402. However, if the rate of cellular tower data change is at or above the threshold value, then the device is in vehicle state 406, and if the rate of cellular tower data change is greater than zero but below the threshold value then the device is in pedestrian state 404.

By way of yet another example, a camera that is a low energy sensor detects light spectrum data and provides the light spectrum data to the mobility state estimation module. The light spectrum data is different based on whether the user is indoors or outdoors, and the mobility state estimation module determines that the device is not in vehicle state 406 if the light spectrum data indicates that the user is indoors. The mobility state estimation module can use the light spectrum data in combination with data from other low energy sensors (e.g., whether the particular wireless networks that are detected by a WiFi component) to determine the mobility state of device 200.

In one or more embodiments, the mobility state estimation module collects data from the low energy sensors at a particular rate to determine the mobility state. The frequency at which the mobility state estimation module collects data from the low energy sensors can vary based on the mobility state. For example, accelerometer data can be collected for k seconds every n seconds, and the values of k and n can vary based on the current mobility state of the device. As examples of values for k and n, when in stationary state 402 accelerometer data can be collected for 2 seconds every 100 seconds, when in pedestrian state 404 accelerometer data can be collected for 2 seconds every 50 seconds, and when in vehicle state 406 accelerometer data can be collected for 5 seconds every 30 seconds. The mobility state estimation module can collect data at different rates in different manners, such as by indicating to the low energy sensors to provide data to the mobility state estimation module at a particular rate, by analyzing data received from the low energy sensors at the desired rate and ignoring other data received from the low energy sensors, and so forth.

Returning to FIG. 2, location estimation module 214 determines, based at least in part on the mobility state determined by module 212, when to activate high energy sensor 206. When activated, high energy sensor 206 provides to location estimation module 214 an indication of the location of device 200. This indication provided by high energy sensor 206 is a more accurate indication than can typically be determined based on low energy sensors 204. For example, based on a signal from a particular wireless network (detected by a low energy sensor 204), location estimation module 214 may be able to determine the location of device 200 within a 200-foot radius around a wireless access point, but within a 10-foot radius around a latitude/longitude coordinate provided by a high energy sensor 206 that is a GPS component. Additionally, the indication provided by high energy sensor 206 is typically a specific geographic location, whereas the specific geographic location of device 200 may not be determinable based on data from low energy sensors 204 alone.

In one or more embodiments, device 200 includes multiple high energy sensors. Location estimation module 214 can determine which one or more of the multiple high energy sensors to activate in different manners. For example, location estimation module 214 can be configured with an indication of the priority or ranking of high energy sensors and activate a first sensor available on device 200 in accordance with this priority or ranking, can activate the one of the multiple high energy sensors that is expected to use the smallest amount of energy to provide data for use by location estimation system 202, can select one of the multiple high energy sensors randomly, and so forth.

Location estimation module 214 determines when to activate high energy sensor 206 based at least in part on the mobility state determined by module 212. Location estimation module 214 can activate high energy sensor 206 at one of multiple different intervals based on the mobility state of device 200, with the number of different intervals being based on the number of possible mobility states. Generally, the faster that device 200 is expected to be moving the shorter the interval. For example, if device 200 is in a vehicle state then the interval can be one value (e.g., 3 minutes), if device 200 is in a pedestrian state then the interval can be another value (e.g., 10 minutes), and if device 200 is in a stationary state then the interval can be yet another value (e.g., 60 minutes). Location estimation module 214 can also indicate to high energy sensor 206 (or otherwise activate high energy sensor 206 for) a desired amount of accuracy based at least in part on the mobility state determined by module 212. Generally, the slower that device 200 is expected to be moving the greater the desired accuracy. For example, if device 200 is in a vehicle state then the accuracy can be one value (e.g., a location indication accurate to within 500 feet), if device 200 is in a pedestrian state then the accuracy can be another value (e.g., a location indication accurate to within 50 feet), and if device 200 is in a stationary state then the accuracy can be another value (e.g., a location indication within 10 feet).

Location estimation module 214 can also determine when to activate high energy sensor 206 based at least in part on identification data 218. Location estimation module 214 keeps track of one or more of the most recently received location indications from high energy sensor 206. Given this most recently received location indication from high energy sensor 206 and identification data 218, location estimation module 214 can readily determine how close device 200 is to the perimeter of one or more places of interest. Further, given the mobility state of device 200 and how close device 200 is to the perimeter of one or more places of interest, and optionally a direction of travel of device 200, location estimation module 214 can readily determine an amount of time that is expected to elapse before device 200 reaches the perimeter of a place of interest. Location estimation module 214 can then determine to not activate high energy sensor 206 until device 200 is expected to be close to the perimeter of a place of interest.

For example, referring again to FIG. 1, assume that based on a most recently received location indication from a high energy sensor, device 102 is located at approximately the center of place 112. Furthermore, assume that place 112 is approximately a circle having a diameter of two miles. If device 102 is in a stationary state, then the high energy sensor need not be activated (or can be activated at large intervals, such as 24 hours) because device 102 is not expected to move outside of place 112. If device 102 is in a pedestrian state, then the high energy sensor need not be activated until the device is expected to be moved to the perimeter of place 112 at a pedestrian rate. The actual pedestrian rate of device 102 (the rate at which device 102 is actually moving) can be determined by device 102, or a typical pedestrian rate (e.g., 2.5 miles per hour (mph)) can be used. If the pedestrian rate is 2.5 mph, then the high energy sensor need not be activated for approximately 24 minutes, which is approximately the amount of time it would take for device 102 to move one mile at the pedestrian rate of 2.5 mph. If device 102 is in a vehicle state, then the high energy sensor need not be activated until the device is expected to be moved to the perimeter of place 112 at a vehicle rate. The actual vehicle rate of device 102 (the rate at which device 102 is actually moving) can be determined by device 102, or a typical vehicle rate (e.g., 30 mph or 70 mph) can be used. If the vehicle rate is 30 mph, then high energy sensor need not be activated for approximately 2 minutes, which is approximately the amount of time it would take for device 102 to move one mile at the vehicle rate of 30 mph.

By way of another example, assume that based on a most recently received location indication from a high energy sensor, device 102 is located approximately half-way between a perimeter of place 114 and a perimeter of place 116, and that these two perimeters are the two closest perimeters of places of interest for device 102. Furthermore, assume that device 102 is approximately 60 miles away from the perimeters of places 114 and 116. If device 102 is in a stationary state, then the high energy sensor need not be activated (or can be activated at large intervals, such as 24 hours). If device 102 is in a pedestrian state of 2.5 mph, then high energy sensor need not be activated for approximately 24 hours, which is approximately the amount of time it would take for device 102 to move 60 miles at the pedestrian rate of 2.5 mph. If device 102 is in a vehicle state of 70 mph, then high energy sensor need not be activated for approximately 51.4 minutes, which is approximately the amount of time it would take for device 102 to move 60 miles at the vehicle rate of 70 mph.

Location estimation module 214 of FIG. 2 can also determine when to activate high energy sensor 206 based at least in part on the place that device 200 is at as well as other nearby places of interest. For example, assume that device 102 is located at approximately the center of place 112, that place 112 is approximately a circle having a diameter of two miles, that the distance between the two parts of the perimeters of places 112 and 114 that are closest to one another is 500 yards, and that the distance from the next closest place of interest for device 102 in the opposite direction as place 114 is 75 miles. If device 102 is moving towards place 114, then the high energy sensor can be activated sooner (e.g., after 20 minutes if at the pedestrian state) and/or more frequently than if device is moving opposite place 114. Activating the high energy sensor sooner and/or more frequently allows the place determination module to more accurately identify when device 102 has moved from place 112 to place 114. However, if device is moving in the direction opposite place 114, the high energy sensor need not be activated sooner and/or more frequently because it will be a longer amount of time (due to the 75 mile distance) until the device would be close to another place of interest.

Returning to FIG. 2, place determination module 216 receives inputs from mobility state estimation module 212 and/or location estimation module 214, and determines based on both those received inputs and identification data 218, a place of interest that device 200 is within. Place determination module 216 provides an indication of this determined place of interest as place estimate 220. This indication is referred to as an estimate of the location of device 200 because the place that device 200 is within is indicated rather than the specific geographic location of device 200. If device 200 is not within any place of interest, then place estimate 220 can indicate that device 200 is not within any place of interest.

The place of interest that device 200 is within can be readily determined, for example, based on identification data 218 (which identifies the areas and/or perimeters of the places of interest) along with the specific geographic location of device 200 received from high energy sensor 206 and/or along with data obtained from one or more low energy sensors 204 (e.g., data indicating from which particular wireless networks signals are detected). The place of interest that device 200 is within can also be determined based on the mobility state of device 200. Place determination module 216 can obtain from location estimation module 214 (or alternatively generate in a manner analogous to location estimation module 214) an indication of how close device 200 is to the perimeter of one or more places of interest and an amount of time that is expected to elapse before device 200 reaches the perimeter of a place of interest. Place determination module 216 can thus determine that device 200 remains within the same place of interest until the amount of time that is expected to elapse before device 200 reaches the perimeter of a place of interest has elapsed.

Additionally, as noted above, situations can arise where device 200 is within two or more places of interest at the same time (due to overlapping places of interest). In such situations, place determination module 216 can provide an indication of the two or more places as place estimate 220, or alternatively select one of the two or more places to indicate as place estimate 220. One of the two or more places can be selected in a variety of different manners, such as applying one or more rules or criteria to select one of the two or more places (e.g., based on which place of interest device 200 was most recently in, based on how close to the perimeter of each place of interest device 200 is, etc.), can select one of the two or more places randomly, and so forth.

Place estimate 220 can be used by other components or modules of device 200 in a variety of different manners. For example, programs can present different user interfaces to a user depending on place estimate 220. By way of another example, programs can be configured to run in different manners (e.g., with different security settings) depending on place estimate 220. By way of yet another example, different data or services can be accessible to programs based on place estimate 220. By way of still another example, place estimate 220 can be provided to a remote service that takes one or more actions depending on place estimate 220.

Local estimation system 202 can also optionally output other information for use by components or modules of device 200. For example, mobility state estimation module 212 can output an indication of the current mobility state of device 200, which can be used by other components or modules of device 200 in various different manners. For example, different components or modules of device 200 may operate only when device 200 has a particular mobility state (e.g., is stationary), and whether such components or modules of device 200 are to be activated can be determined based on the indication of the current mobility state of device 200 output by mobility state estimation module 212. By way of another example, location estimation module 214 can output an indication of the location of device 200 obtained from high energy sensor 206.

Thus, it can be seen that the energy efficient location detection techniques discussed herein allow the place of interest (if any) that a device is located within to be identified based on low energy sensors in many situations. High energy sensors can be activated at appropriate times, but need not be continually activated when the determination of the place of interest can be made based on data from the low energy sensors. Thus, devices employing the techniques discussed herein use energy efficiently by reducing the use of high energy sensors.

Figure 5:
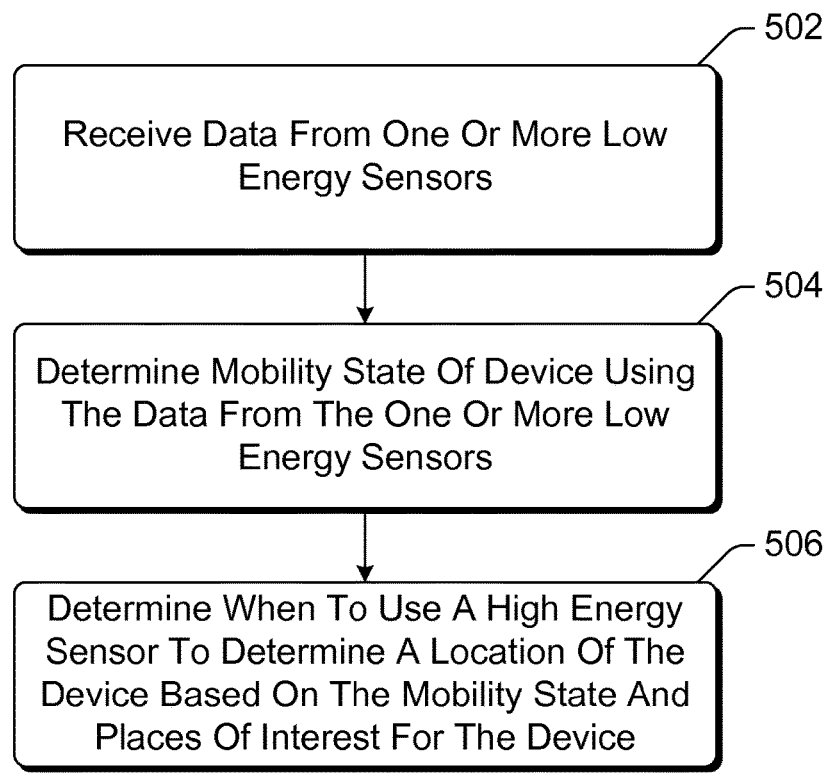
FIG. 5 is a flowchart illustrating an example process for implementing the energy efficient location detection in accordance with one or more embodiments.

FIG. 5 is a flowchart illustrating an example process 500 for implementing the energy efficient location detection in accordance with one or more embodiments. Process 500 is carried out by a device, such as device 102 of FIG. 1 or device 200 of FIG. 2, and can be implemented in software, firmware, hardware, or combinations thereof. Process 500 is shown as a set of acts and is not limited to the order shown for performing the operations of the various acts. Process 500 is an example process for implementing the energy efficient location detection; additional discussions of implementing the energy efficient location detection are included herein with reference to different figures.

In process 500, data is received from one or more low energy sensors (act 502). Data can be received from various different low energy sensors, which can be part of the device implementing process 500 or separate devices from the device implementing process 500, as discussed above.

The mobility state of the device is determined using the data received from the one or more low energy sensors (act 502). Various different mobility states can be determined as discussed above.

Based on the mobility state and one or more places of interest for the device implementing process 500, a determination is made as to when to use a high energy sensor to determine a location of the device (act 506). This determination can be made, for example, based on a rate at which the device is moving and how close the device is to the perimeter of at least one of the one or more places of interest, as discussed above.

Various actions such as communicating, receiving, sending, storing, generating, obtaining, and so forth performed by various modules are discussed herein. It should be noted that the various modules can cause such actions to be performed. A particular module causing an action to be performed includes that particular module itself performing the action, or alternatively that particular module invoking or otherwise accessing another component or module that performs the action (or performs the action in conjunction with that particular module).

Figure 6:
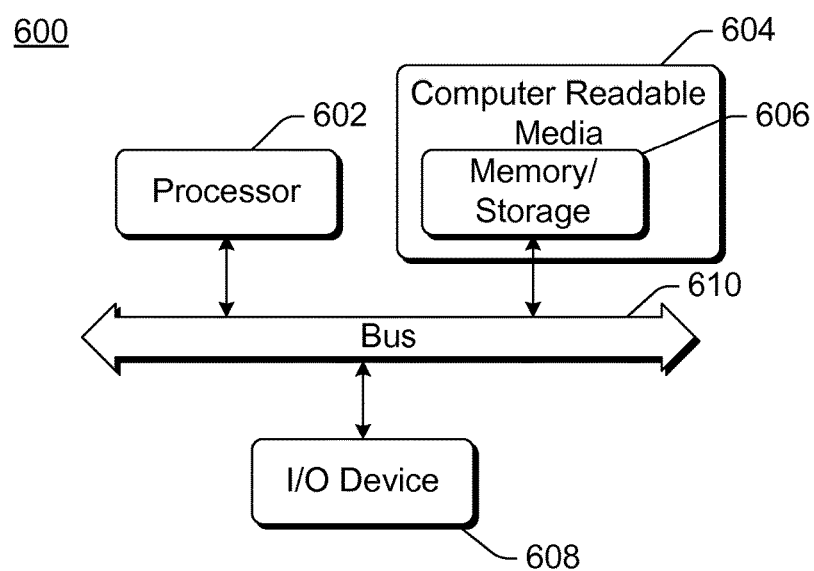
FIG. 6 illustrates an example computing device that can be configured to implement the energy efficient location detection in accordance with one or more embodiments.

FIG. 6 illustrates an example computing device 600 that can be configured to implement the energy efficient location detection in accordance with one or more embodiments. Computing device 600 can be, for example, device 102 of FIG. 1 or device 200 of FIG. 2.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, low energy sensors, high energy sensors, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the energy efficient location detection techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a device, the method comprising:
   using, at the device, one or more low energy sensors to determine a mobility state of the device;
   determining, based on both the mobility state of the device and one or more places of interest for the device, an amount of time that is to elapse before the device reaches one of the one or more places of interest, the one place of interest having been defined prior to determining the amount of time, the device having one of multiple mobility states and each of the multiple mobility states corresponding to a different amount of time that is to elapse, each of the one or more places of interest including one or more attributes that define a respective place of interest using data received from the one or more low energy sensors, the one or more attributes including signals that are detected when the device is within a particular place of interest;
   determining to not activate a high energy sensor to determine a location of the device until the amount of time has elapsed; and
   determining that the location of the device is within the one place of interest based on the one or more attributes that define the one place of interest, the one place of interest having multiple locations that are not physically adjacent geographic locations, each of the multiple locations including a signal indicating the one place of interest as a same place of interest.

2. A method as recited in claim 1, the determining the amount of time further comprising determining the amount of time based on how close the device is to a perimeter of the one place of interest.

3. A method as recited in claim 1, the one place of interest comprising a place of interest that the device is within, and the determining the amount of time further comprising determining the amount of time based on how close the device is to a perimeter of the one place of interest.

4. A method as recited in claim 1, further comprising determining, based on the location of the device determined by the high energy sensor, which of the one or more places of interest the device is within.

5. A method as recited in claim 1, further comprising determining, based on the mobility state of the device, which of the one or more places of interest the device is within.

6. A method as recited in claim 5, a specific geographic location of the place of interest that the device is within being unknown.

7. A method as recited in claim 1, further comprising outputting an indication of the mobility state of the device to activate a component of the device based on the mobility state of the device.

8. A method as recited in claim 1, the one or more low energy sensors being part of the device.

9. A method as recited in claim 1, the one or more low energy sensors comprising sensors that each use less than a threshold amount of energy to provide data for use by a location estimation system that performs the using, the determining the amount of time, and the determining to not activate the high energy sensor.

10. A method as recited in claim 1, the high energy sensor comprising a sensor that uses greater than a threshold amount of energy to provide data for use by a location estimation system that performs the using, the determining the amount of time, and the determining to not activate the high energy sensor.

11. A device comprising:
one or more processors; and
one or more computer readable media having stored thereon multiple instructions that, when executed by the one or more processors, cause the one or more processors to:
receive data from one or more low energy sensors;
determine, based on the data, a mobility state of the device;
vary a frequency at which the data is collected from the one or more low energy sensors based on the mobility state of the device;
wait to use a high energy sensor to determine a location of the device until, based on both the indication of the mobility state of the device and one or more places of interest for the device, the device is determined to be within a threshold distance of at least one of the one or more places of interest, the at least one of the one or more places of interest having been defined prior to determining to wait to use the high energy sensor, each of the one or more places of interest including one or more attributes that define a respective place of interest using the data received from the one or more low energy sensors, the one or more attributes including signals that are detected when the device is within a particular place of interest; and
determine that the location of the device is within the one place of interest based on the one or more attributes that define the one place of interest, the one place of interest having multiple locations that are not physically adjacent geographic locations, each of the multiple locations including a signal indicating the one place of interest as a same place of interest.

12. A device as recited in claim 11, the instructions that cause the one or more processors to wait to use the high energy sensor comprising instructions that cause the one or more processors to determine when the device is within the threshold distance of the at least one place of interest based on how close the device is to a perimeter of the at least one place of interest.

13. A device as recited in claim 11, an additional one of the one or more places of interest comprising a place of interest that the device is within, and the instructions that cause the one or more processors to wait to use the high energy sensor comprising instructions that cause the one or more processors to determine when the device is within a threshold distance of the at least one place of interest based on how close the device is to a perimeter of the at least one place of interest.

14. A device as recited in claim 11, the multiple instructions further causing the one or more processors to determine, based on the location of the device determined by the high energy sensor, one of the one or more places of interest that the device is within.

15. A device as recited in claim 11, the multiple instructions further causing the one or more processors to determine, based on the mobility state of the device, one of the one or more places of interest that the device is within.

16. A device as recited in claim 15, the mobility state of the device comprising one of a stationary state, a pedestrian state, and a vehicle state.

17. A device as recited in claim 11, the one or more low energy sensors comprising sensors that each use less than a threshold amount of energy to provide data for use by a location estimation system of the device, and the high energy sensor comprising a sensor that uses at least the threshold amount of energy to provide data for use by the location estimation system of the device.

18. One or more computer storage media devices having stored thereon multiple instructions that, when executed by one or more processors of a device, cause the one or more processors to perform acts comprising:
receiving data from one or more low energy sensors, each of the one or more low energy sensors using less than a threshold amount of energy to provide data for use by a location estimation system of the device;
determining, at the device, a mobility state of the device based on the data, the mobility state of the device being one of multiple different states, the multiple different states including a stationary state, a pedestrian state, and a vehicle state;
determining, based on both the mobility state of the device and how close the device is to a perimeter of at least one of one or more places of interest for the device, an amount of time that is to elapse before the device reaches the at least one place of interest, the at least one place of interest being a user defined place of interest defined prior to determining the amount of time, the amount of time that is to elapse varying based on the mobility state of the device, each of the one or more places of interest including one or more attributes that define a respective place of interest using the data received from the one or more low energy sensors, the one or more attributes including a signal that is detected when the device is within a particular place of interest and a geographical location;
determining to not activate a high energy sensor to determine a location of the device until the amount of time has elapsed, the high energy sensor indicating the geographical location of the device; and
determining that the location of the device is within the one place of interest based on the one or more attributes that define the one place of interest, the one place of interest having multiple locations that are not physically adjacent geographic locations, each of the multiple locations including a signal indicating the one place of interest as a same place of interest.

19. A device as recited in claim 11, the signals including at least a wireless network having a particular service set identifier (SSID) and the at least one place of interest for the device having been defined as any location where the SSID is detected.

20. A method as recited in claim 9, the threshold amount of energy comprising a relative value determined based on a largest amount of energy used by a particular number of the one or more low energy sensors.

\* \* \* \* \*